(12) United States Patent
Sands et al.

(10) Patent No.: US 7,599,869 B2
(45) Date of Patent: Oct. 6, 2009

(54) PRE-TRADE COMPLIANCE CHECKING IN A PORTFOLIO MANAGEMENT SYSTEM

(75) Inventors: Stuart Sands, Oakland, CA (US); Stephen B. Ward, San Francisco, CA (US)

(73) Assignee: Charles Schwab & Co., San Francisco, CA (US)

( * ) Notice: Subject to any disclaimer, the term of this patent is extended or adjusted under 35 U.S.C. 154(b) by 1634 days.

(21) Appl. No.: 09/971,464

(22) Filed: Oct. 5, 2001

(65) Prior Publication Data

US 2002/0082979 A1  Jun. 27, 2002

Related U.S. Application Data

(60) Provisional application No. 60/239,855, filed on Oct. 11, 2000.

(51) Int. Cl.
*G06Q 40/00* (2006.01)
(52) U.S. Cl. .................................................. 705/36 R
(58) Field of Classification Search ............... 705/26, 705/37, 36
See application file for complete search history.

(56) References Cited

U.S. PATENT DOCUMENTS

| | | | |
|---|---|---|---|
| 5,517,406 A | 5/1996 | Harris et al. | 364/408 |
| 5,704,045 A | 12/1997 | King et al. | 395/235 |
| 5,749,077 A | 5/1998 | Campbell | 705/36 |
| 5,775,734 A | 7/1998 | George, Jr. | 283/57 |
| 5,878,405 A | 3/1999 | Grant et al. | 705/39 |
| 5,893,079 A * | 4/1999 | Cwenar | 705/36 R |
| 5,918,218 A | 6/1999 | Harris et al. | 705/37 |
| 5,926,792 A | 7/1999 | Koppes et al. | 705/4 |
| 6,064,986 A | 5/2000 | Edelman | 705/36 |
| 6,144,947 A * | 11/2000 | Schwartz | 705/36 R |
| 6,820,069 B1 * | 11/2004 | Kogan et al. | 706/46 |
| 2002/0059107 A1 * | 5/2002 | Reich et al. | 705/26 |
| 2005/0187857 A1 * | 8/2005 | Tull | 705/37 |

(Continued)

FOREIGN PATENT DOCUMENTS

WO    PCT/US00/08642    *  3/2000

OTHER PUBLICATIONS

Business Editors: CMS completes new cash management module for money market fund managers; includes SEC 2a-7 regulatory reports and database of 40,000 short-term instruments: Business Wire, New York: Jan. 4, 1999. p. 1.*

(Continued)

*Primary Examiner*—Hani Kazimi
*Assistant Examiner*—Bijendra K Shrestha
(74) *Attorney, Agent, or Firm*—Townsend and Townsend and Crew LLP

(57) ABSTRACT

A mechanism for pre-trade compliance checking in a mutual funds portfolio management system is disclosed. The preferred embodiment of the invention records the interpretations and assumptions of each rule and limit. The preferred embodiment of the invention is specifically adapted for compliance with Rule 2a-7. The implementation of Rule 2a-7 is composed of two parts: (1) Determination of Entity Exposure; and (2) Determination of Limits. For each security traded in a money market fund in the portfolio management system, it is necessary to determine the exposure of each entity associated with the security. This exposure is composed of two parts: (1) the role the entity plays in the context of this security; and (2) the amount of exposure (in percentage). With the exposure determined, it is possible to determine where any fund is in relation to Rule 2a-7 limits.

22 Claims, 16 Drawing Sheets

OTHER PUBLICATIONS

Kravitt et al., SEC technical amendment to Rule 2a-7, http://www.securitization.net/knowledge/article.asp, Dec. 29, 1997, p. 1-10.*

US Securities and Exchange Commission: Money Market Funds, p. 1; modified Oct. 2000.*

Dictionary.com: 3 result for money market fund, p. 1-4.*

Business Wire: CMS completes new cash management module for money market fund managers; includes SEC 2a-7 regulatory reports and database of 40,000 short-term instruments: Business Wire, New York: Jan. 4, 1999. p. 1.*

Kravitt et al., SEC technical amendment to Rule 2a-7, http://ww.securitization.net/knowledge/article.asp, Dec. 29, 1997, p. 1-10.*

McGinn, C: Compliance rises to top side of buy side list, 1993, Wall Street & Technology, Furst Quarter, p. 16, 3pgs.*

Business Editors: CMS completes new cash management module for money market fund managers, Jan. 4, 1999, Business Wire, New York, p. 1.*

Kravit, J: SEC Technical amendments to rule 2a-7, Dec. 29, 1997,www.securitization.net/knowledge/, pp. 1-6.*

* cited by examiner

PRE-TRADE COMPLIANCE CHECKING IN A PORTFOLIO MANAGEMENT SYSTEM

CROSS-REFERENCE TO RELATED APPLICATIONS

This application claims priority to U.S. Ser. No. 60/239,855, filed Oct. 11, 2000.

BACKGROUND OF THE INVENTION

1. Technical Field

The invention relates to Mutual Funds portfolio management. More particularly, the invention relates to pre-trade compliance checking in a Mutual Funds portfolio management system.

2. Description of the Prior Art

Trading in the heavily regulated mutual fund industry involves much more than buying and selling securities. Rules and regulations from many different organizations govern the mutual funds industry. Traders must comply with a seemingly infinite list of portfolio diversification rules, including all of the mandates in the Investment Company Act of 1940 (a relevant portion of which is also referred to herein a Rule 2a-7, any other pertinent State and Federal regulations, client restrictions, and an investments firm's in-house rules.

Failure to adhere to the rules and regulations can have large negative consequences for a fund with respect to fines, disadvantageous tax consequences, bad publicity, and, ultimately, funds under management. Thus, the ability to determine a funds position quickly in relation to the large variety of compliance rules and regulations before a trade is executed is extremely valuable.

One proposed compliance system (see J. Michaels, *Compliance Under Control.* (*Compalert Securities Trading Regulations Compliance System for the Merrin Financial Trading System*), Wall Street & Technology, vol. 9, no. 9, pp. 17-20 (May 1992)) attempts to determine compliance at the time a trade is executed. Thus, a trader must first enter a trade and then attempt to execute the trade before he knows whether the trade is in compliance and therefore acceptable. This arrangement is inefficient.

It would be advantageous to provide a mechanism for pre-trade compliance checking in a portfolio management system in which a trader can determine what actions are available with regard to compliance before any trades are entered into the portfolio management system.

SUMMARY OF THE INVENTION

The invention provides a mechanism for pre-trade compliance checking in a portfolio management system in which a trader can determine what actions are available with regard to compliance before any trades are entered into the portfolio management system. The preferred embodiment of the invention records the interpretations and assumptions of each rule and limit. The preferred embodiment of the invention is specifically adapted for compliance with Rule 2a-7. The current implementation of the system includes checks for Rule 2a-7, IRS SubChapter M, Distributed Funds Status (for off-shore funds), and many internally set limits from the SchwabFunds Credit Analysts and Fund Portfolios. The system is extensible and it is relatively easy to add, delete, and modify Compliance Rules and their associated limits.

The implementation of Rule 2a-7 is composed of two parts:
1. Determination of Entity and Industry Exposure; and
2. Determination of Limits.

Determination of Entity Exposure

For each security traded in a money market fund in the portfolio management system, it is necessary to determine the exposure of each entity associated with the security. This exposure is composed of two parts:
  The role the entity plays in the context of this security; and
  The amount of exposure (in percentage).

Determination of Industry Exposure

For each security traded in a money market fund in the portfolio management system, it is necessary to determine the exposure of each industry associated with the security. This exposure is composed of two parts:
  The industry (or industries) associated with this security; and
  The amount of exposure (in percentage).

Determination of Limits

With the exposure determined, it is now possible to determine where any fund is in relation to Rule 2a-7 limits.

BRIEF DESCRIPTION OF THE DRAWINGS

FIG. 7 is a printscreen that displays a detail window activated when the trader double-clicks a fund in the Quick Look window to see details of the rules applied and each of their limits according to the invention;

FIG. 9 is a printscreen showing a detail window of identifying exactly which rule is causing the problem according to the invention;

DETAILED DESCRIPTION OF THE INVENTION

The invention provides a mechanism for pre-trade compliance checking in a Mutual Funds portfolio management system in which a trader can determine what actions are available with regard to compliance before any trades are entered into the portfolio management system. The preferred embodiment of the invention records the interpretations and assumptions of each rule and limit. The preferred embodiment of the invention is specifically adapted for compliance with Rule 2a-7. The implementation of Rule 2a-7 is composed of two parts:

1. Determination of Entity and Industry Exposure; and
2. Determination of Limits.

Determination of Entity Exposure

For each security traded in a money market fund in the portfolio management system, it is necessary to determine the exposure of each entity associated with the security. This exposure is composed of two parts:

The role the entity plays in the context of this security; and
The amount of exposure (in percentage).

Figure 1:
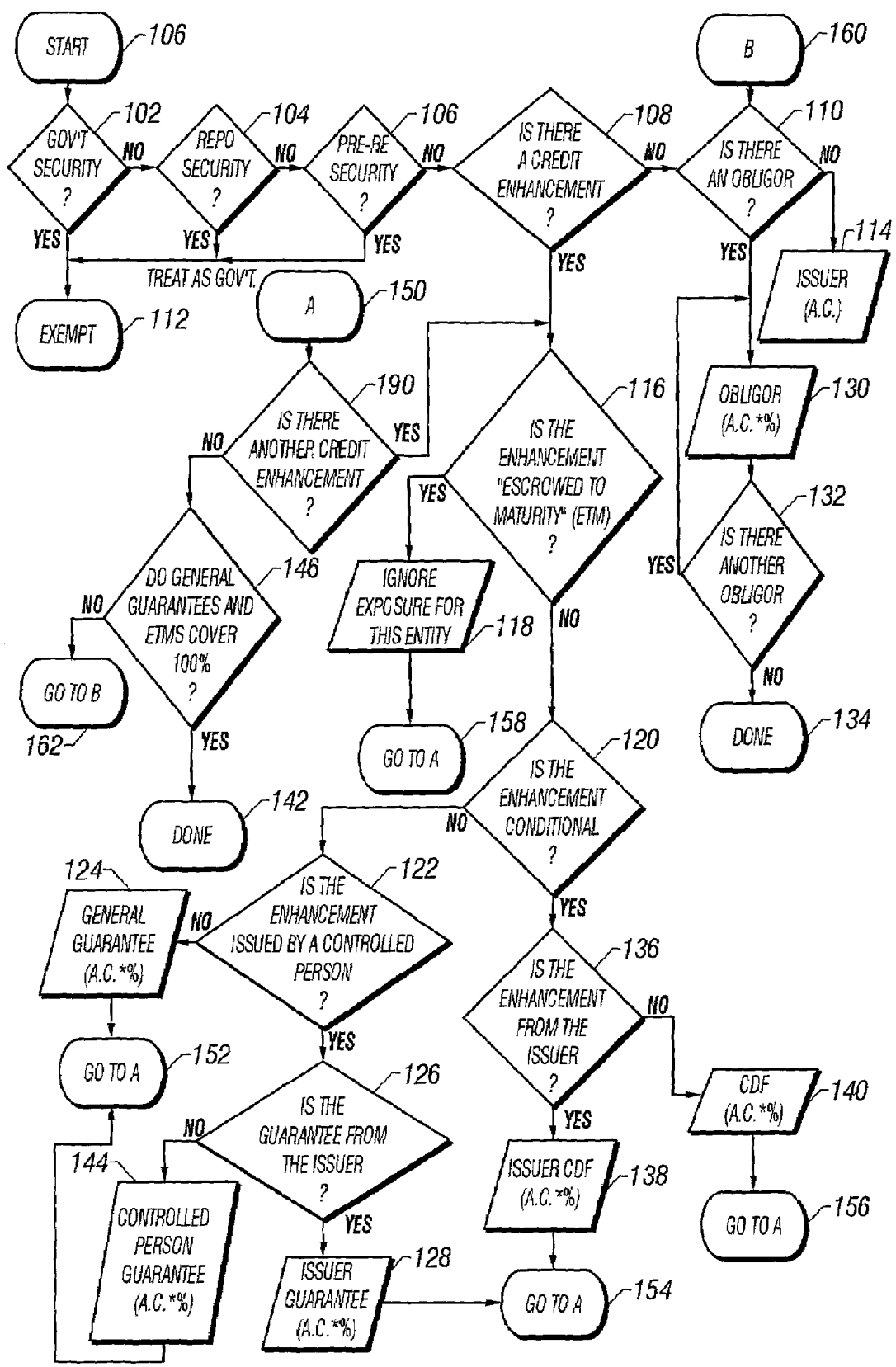
FIG. 1 is a flow diagram that details the logic used to arrive at the exposure for each entity of interest according to the invention.

FIG. 1 is a flow diagram that details the logic used to arrive at the exposure for each entity of interest. The decision tree is used to categorize exposure to entities for each lot. the calculated exposure is used only for the 2a-7 issuer diversification and guarantor diversification limit checks. The number in parentheses designates the value that is attributable to the entity. In FIG. 1, A.C.=amortized cost.

In FIG. 1, the Rule 2a-7 determination of entity exposure starts (106). A determination is made whether the security of interest is a Government security (102). If the security is a Government security, then it is exempt under Rule 2a-7 (112).

If security is not a Government security, then a determination is made whether the security is a repurchase agreement (repo) security (104). If the security is a repo security, then it is treated as a Government security and is therefore exempt (112). If the security is not a repo security, then a determination is made whether it is a pre-refunded (pre-re) security (106). Again, if the security is determined to meet this criteria, then it is treated as a Government security and determined to be exempt (112).

If the security is neither a Government security, repo security, nor pre-re security, then a determination is made as to whether there is a credit enhancement (108).

If there is a credit enhancement (108), then a determination is made if the enhancement is escrowed to maturity (116). If the enhancement has not escrowed to maturity, then a determination is made if the enhancement is conditional (120). If the enhancement is conditional, then a determination is made if the enhancement is from the issuer (136). If the enhancement is not from an issuer, then the entity exposure is that of a Conditional Demand Feature (CDF), and is the amortized cost times percent (140).

The process then continues (156) to determine if there is another credit enhancement (190). If there is an enhancement from the issuer, then the entity exposure is the issuer's conditional demand feature (138). Thereafter, the process continues (154) to determine if there is another credit enhancement (150; 190).

If the enhancement is not conditional (120) then a determination is made that the enhancement is issued by a "Controlled Person". This is a person that is controlled by the Issuer and, therefore, is not independent. Thus, this enhancement is not as valuable to a buyer as an enhancement made by a non-controlled person who is not tied to the issuer of the debt. If the enhancement is not issued by a controlled person, then the entity exposure is a general guarantee and the exposure is the amortized cost times a percent (124) and the process continues (152; 150) to determine if there is another credit enhancement (190).

If the enhancement is issued by a controlled person, (122) then a determination is made if the guarantee is from an issuer (126). If the guarantee is from an issuer, then the entity exposure is an issuer guarantee, and is the amortized cost times a percent (128) and the process continues (154; 150) to determine if there is another credit enhancement (190).

If there is no guarantee from the issuer, then the entity exposure is a controlled person guarantee, and is the amortized cost times percent (144). Thereafter the process continues (152; 150) and a determination is made if there is another credit enhancement (190). If there is another credit enhancement (190) then the process continues with a determination whether there is an enhancement escrowed to maturity. If there is an enhancement escrowed to maturity, then the entity exposure is such that the exposure is ignored for the entity (118) and the process continues (158; 150).

If there is not another credit enhancement (190) then a determination is made whether the general guarantees and the enhancements escrowed to maturity cover 100% (146). If they do, then the process is completed (142) and if they do not then the process continues (162; 160) to determine if there is another obligor or not (110).

If there is no credit enhancement, then a determination is made whether there is an obligor (110). If there is no obligor, then the entity is the issuer and the security is an issuer security. Here, the exposure is the issuer amortized cost (114). Briefly, if we find 100% coverage by enhancers, we never look to obligors or issuers. We only continue down the path if there is less than 100% coverage. We next move to Obligors and if we are still less than 100%, we then move finally to issuers.

If there is an obligor, then the entity exposure is that of the obligor (130). A determination is also made if there is another obligor (132). If there is, then the process loops back to determine an amortized cost times a percent. If there is not another obligor, then the process is completed (134).

Determination of Limits

Figure 2:
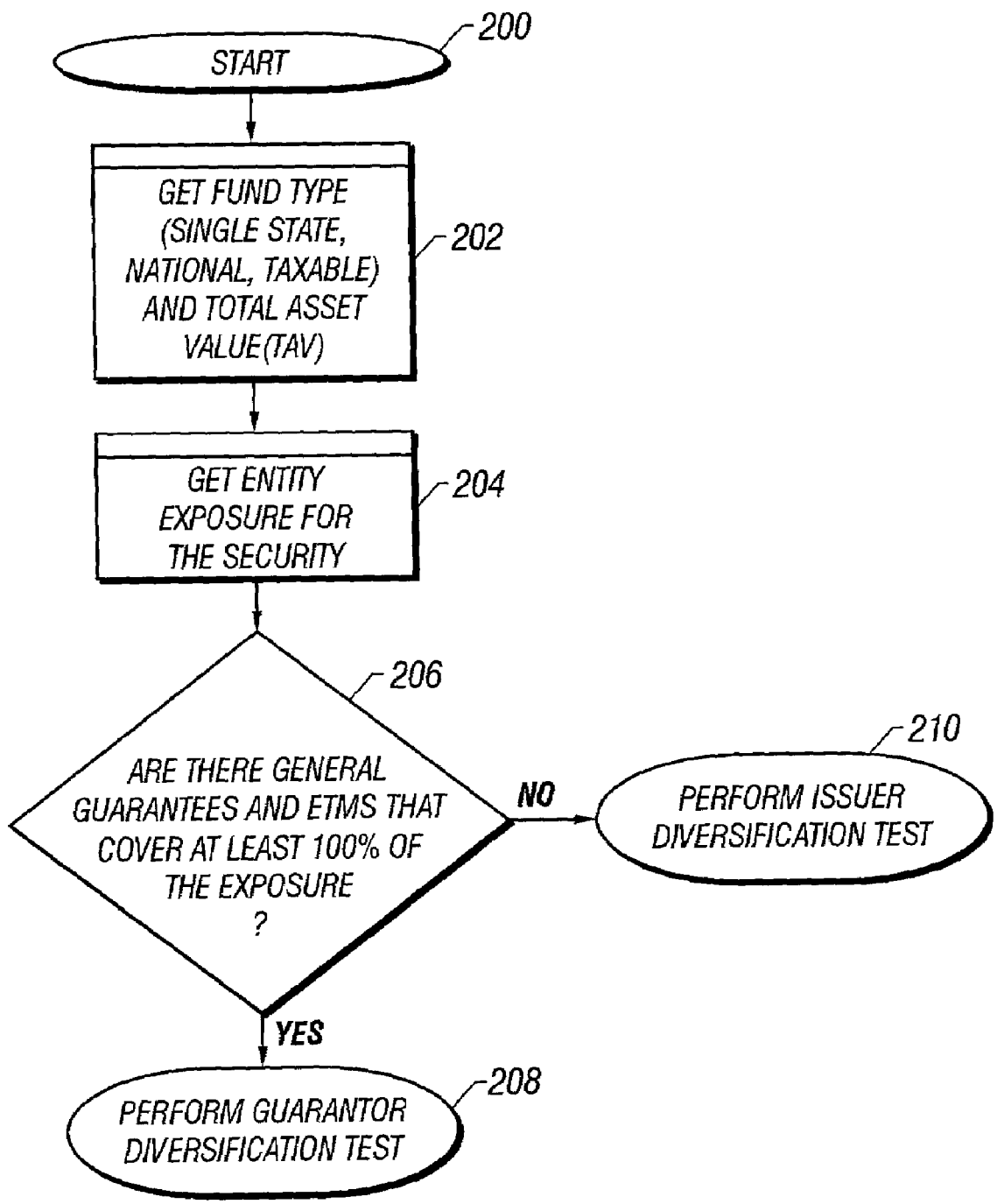
FIG. 2 is a flow diagram that shows a decision flow for a Rule 2a-7 determination of entity limits according to the invention.
Figure 3:
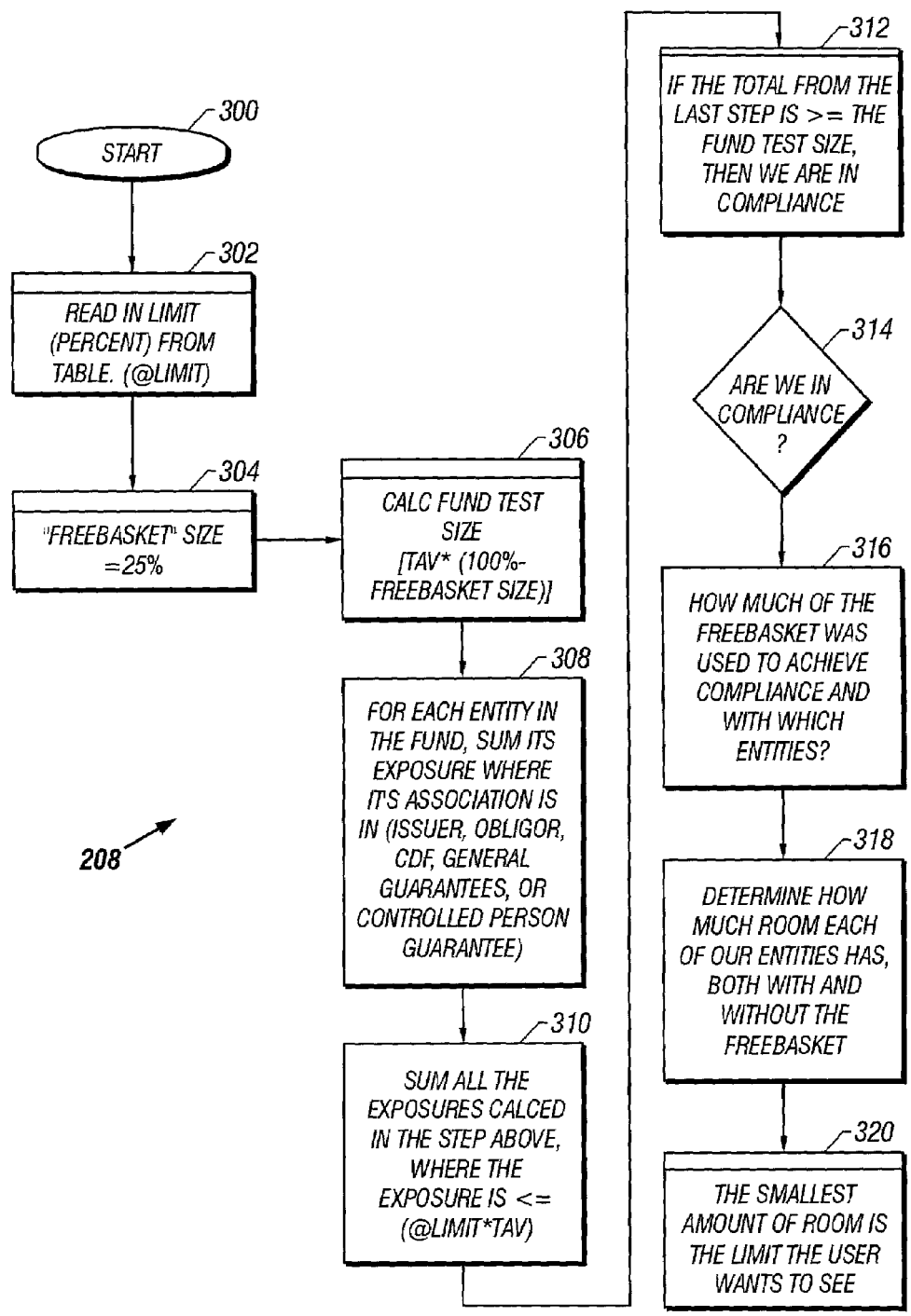
FIG. 3 is a flow diagram that shows a decision flow for a Rule 2a-7 guarantee diversification determination according to the invention.
Figure 4:
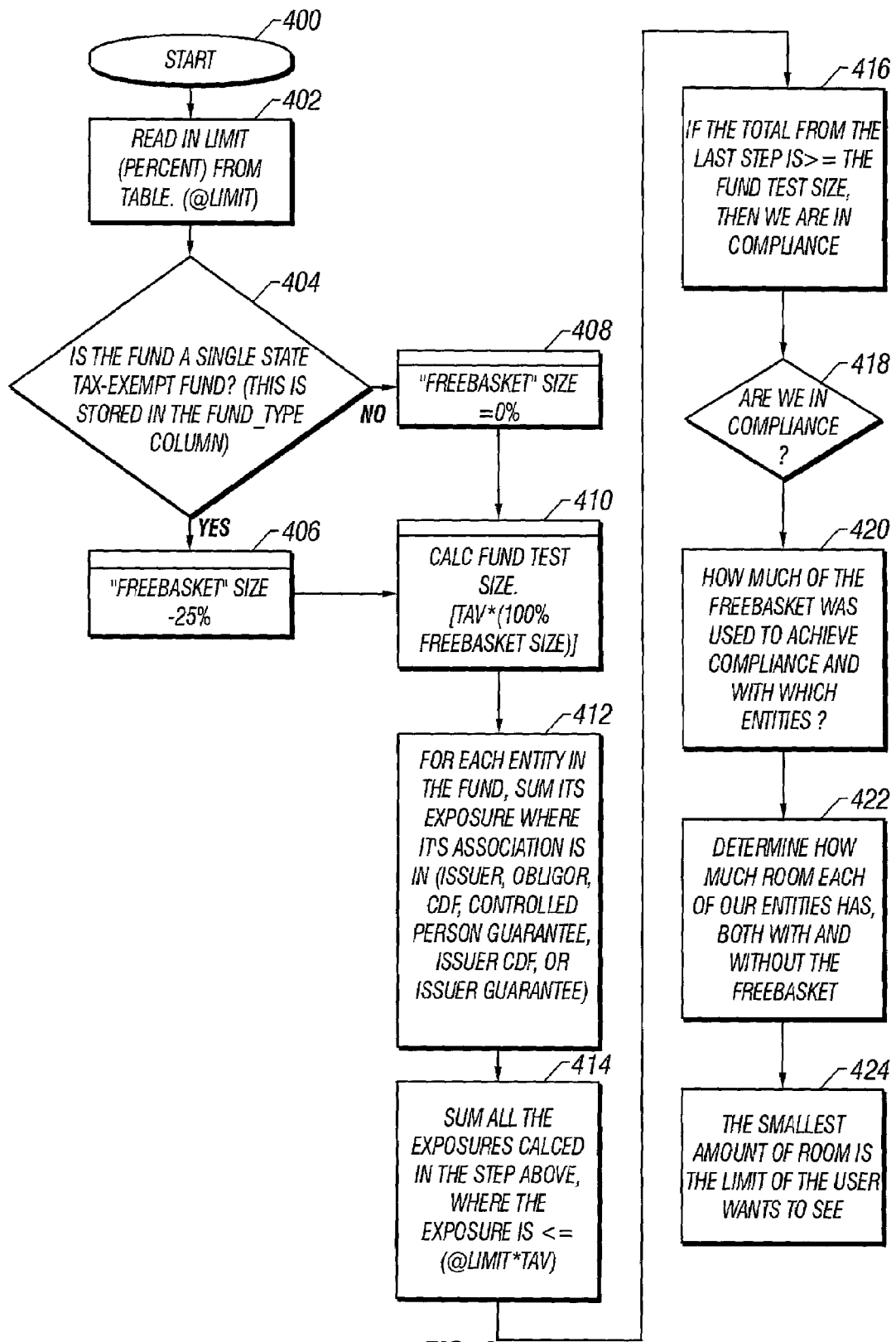
FIG. 4 is a flow diagram that shows a decision flow for a Rule 2a-7 issuer diversification determination according to the invention.

With the exposure determined, it is now possible to determine where any fund is positioned inrelation to Rule 2a-7 limits. FIGS. 2-4 are flow diagrams that detail how a dollar limit is arrived at for any entity of interest. In particular, FIG. 2 shows a decision flow for a Rule 2a-7 determination of entity limits; FIG. 3 shows a decision flow for a Rule 2a-7 guarantee diversification determination; and FIG. 4 shows a decision flow for a Rule 2a-7 issuer diversification determination.

FIG. 2 is a process flow for a Rule 2a-7 determination of entity limits. At the start of the process (200) the system gets the fund type (single, state, national, taxable) and total asset value (TAV) (202). The system then gets the entity exposure for the security (204). (See FIG. 1). A determination is made as to whether the security is escrowed to maturity or there are general guarantees covering at least 100% of the exposure (206). If there are general guarantees and ETMs that cover at least 100% of the exposure, then the system performs a guarantor diversification test (208) (see FIG. 3). If not, then the system performs an issuer diversification test (210) (see FIG. 4).

FIG. 3 is a process showing the Rule 2a-7 guarantee diversification. At the start of the process (300) the system reads in a limit (percent) from a table (302). The system sets a free basket sized to 25% (304) (this number is parameter driven, i.e., it is read from a table and thus easily modified) and a calculation is made to determine the fund test limit (306). For each entity that plays a particular role listed in (308) in the fund, the exposure is summed (308). Thereafter, sum all exposures calculated in step 308, where the exposure is less than or equal the limit value (310). If the total from the previous step is greater than or equal to the fund test size, then the fund is in compliance with the rule. (312). A test is then made to determine if the transaction is in compliance (314). A determination is then made as to how much of the free basket was used to achieve compliance and with which entities (316). Further, a test may determine how much room each of the entities has both with and without the free basket (318). The smaller room is the limit the user wants to see with regard to the trade (320).

FIG. 4 is a process showing the Rule 2a-7 issuer diversification test. At the start of the process (400), the system reads in a limit (%) from the table (402). A determination is made whether the fund is a single state tax exempt fund or not (404). If the fund is not a single state tax exempt fund, then the free basket size is set to zero percent (408) and a calculation is made for the fund test size (410). If the fund is a single state tax exempt fund, then the free basket size is set to 25% (406) (this value is also read from a table), and a calculated fund test size is determined (410).

Thereafter, for each entity in the fund, the exposure is summed where it's association is one of the following: issuer, obligor, CDF, controlled person guarantee, issuer CDF, or issuer guarantee (412). Thereafter all exposures calculated in the step above are summed (414). If the total from the summation step is greater than or equal to the fund test size, then the transaction is in compliance (416). A determination is made if there is compliance (418). A further determination is made as to how much of the free basket was used to achieve compliance and with which entities (420). And another determination made as to how much room each of the entities has both with and without the free basket (422) where the smallest amount of room is the limit the user wants to see (424).

Figure 5A:
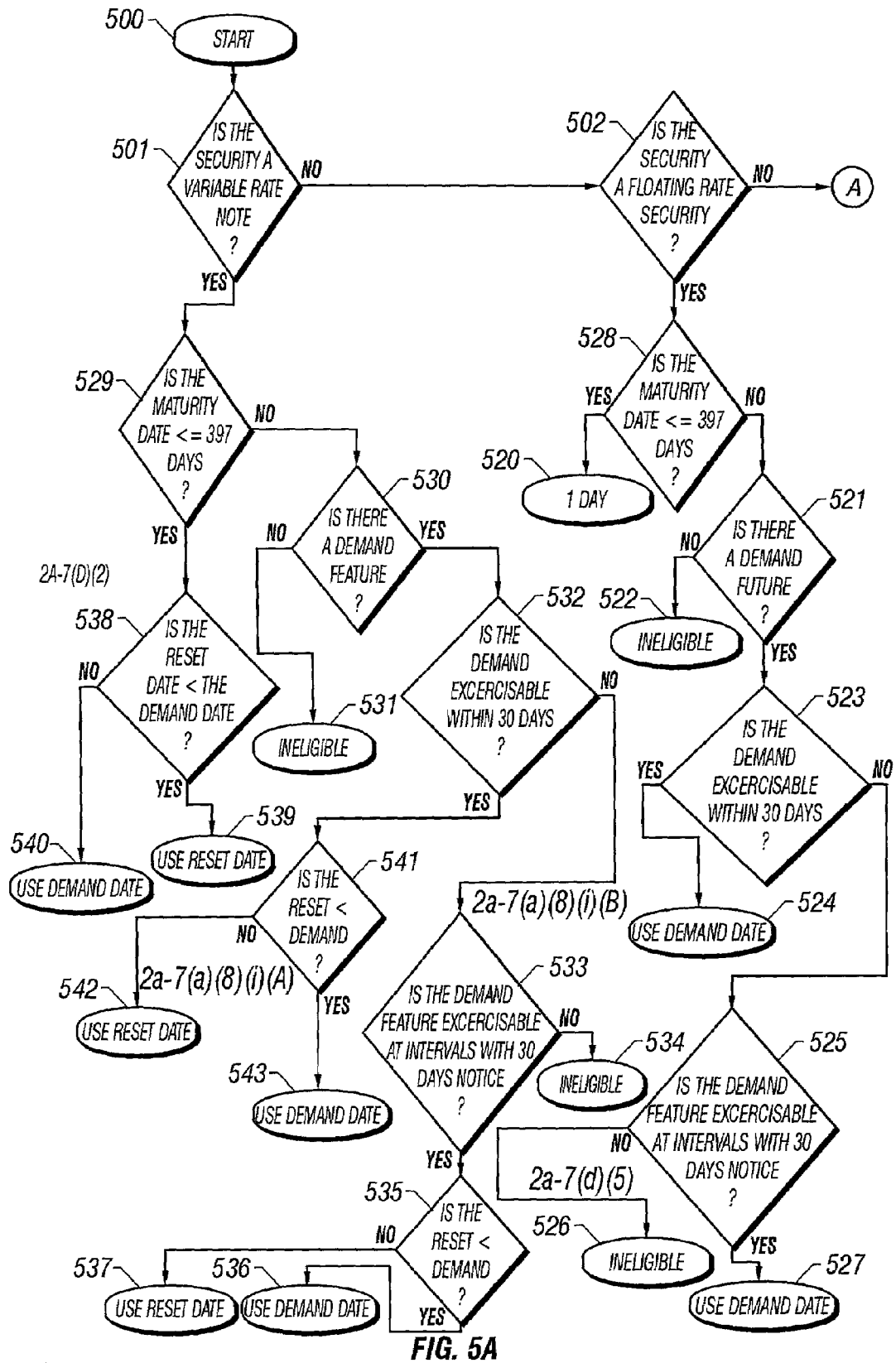
FIGS. 5(a) and 5(b) show a flow diagram that shows a process flow for Rule 2a-7(d) time limits according to the invention.
Figure 5B:
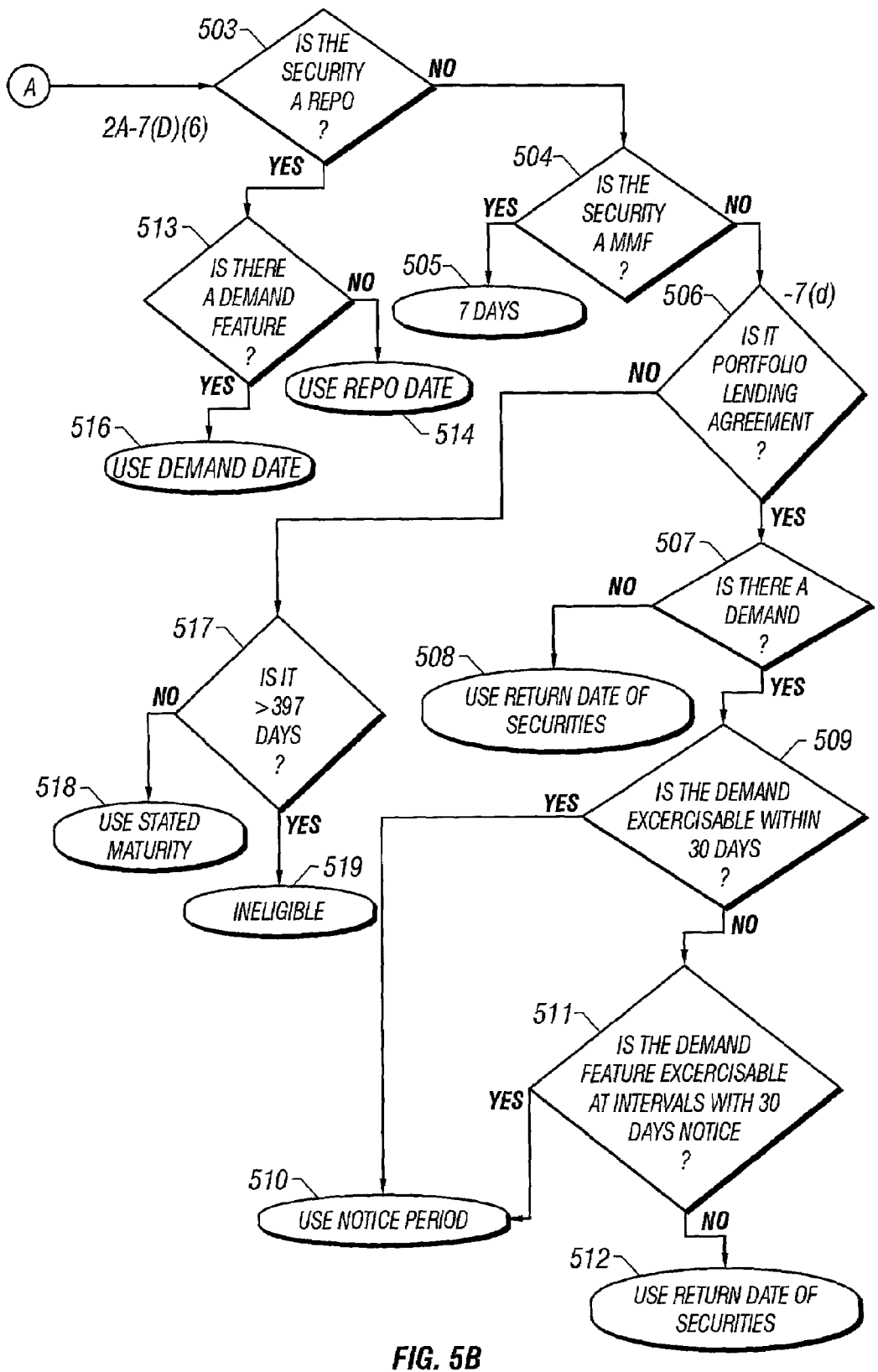

FIGS. 5(a) and 5(b) show a flow diagram that shows a process flow for Rule 2a-7(d) time limits.

FIGS. 5(a) and 5(b) show a flow diagram showing Rule 2a-7(d) logic to determine a date for maturity calculations. When the process starts (500) a determination is made as to whether the security is a variable rate note (501). If the security is a variable rate note, then a determination is made as to whether the maturity date is less than or equal to 397 days (529) from the current trading date. If the maturity date is less than or equal to 397 days (Rule 2a-7(d)(2)), then a determination is made as to whether the reset date is less than the demand date (538). If the reset date is less than the demand date, then the process uses the reset date (539). If not, the process uses the demand date (540).

If the maturity date is not less than or equal to 397 days (529), then a determination is made as to whether there is a demand feature (530). If there is not a demand feature, then the security is ineligible (531). If there is a demand feature (530), then a determination is made as to whether the demand is exercisable within thirty days (532). If the demand is exercisable within thirty days, then a determination is made as to whether the reset is less than the demand (541). If the reset is less than the demand, then the system uses the demand date (543). If not, (Rule 2a-7(a)(8)(i)(a)), then the reset date is used (542).

If the demand it not exercisable within thirty days (532), then a determination is made as to whether the demand features is exercisable at intervals with thirty days' notice. (Rule 2a-7(a)(8)(i)(b)) (533). If the demand feature is not exercisable at intervals within thirty days' notice, then the security is ineligible (534). If the demand feature is exercisable (Rule 2a-7(d)(3)), then a determination is made as to whether the reset is less than the demand (535). If the reset is less than the demand, then the system uses a demand date (536). If not, then the system uses the reset date (537).

If the security is not a variable rate note (501) then a determination is made as to whether the security is a floating rate security (502). If the security is a floating rate security, then a determination is made as to whether the maturity date is less than or equal to 397 days from the current trading date (520). If the maturity date is less than or equal to 397 days, then the date is set at one day (Rule 2a-7(d)(4)) (528). If the maturity date is not less than or equal to 397 days, then a determination is made as to whether there is a demand feature (521). If there is not a demand feature, then the security is ineligible (522). If there is a demand feature, then a determination is made as to whether the demand is exercisable within thirty days (523). If the demand is exercisable within thirty days, then the system uses the demand date (524). If the demand is not exercisable within thirty days, then a determination is made as to whether the demand feature is exercisable at intervals with thirty days' notice (525). If the demand feature is not exercisable at intervals within thirty days' notice (Rule 2a-7(d)(5)), then the security is ineligible (526). If the demand feature is exercisable at intervals with thirty days' notice then the system uses the demand date (527).

If the security is not a floating rate security (502), then a determination is made as to whether the security is a repo (503) under Rule 2a-7(d)(6). If the security is a repo, then a determination is made as to whether there is a demand feature (513). If there is a demand feature, then the system uses the demand date (516). If there is no demand feature, then the system uses the repo date (514).

If the security is not a repo, then a determination is made as to whether the security is a money market fund (MMF) (504). If the security is an MMF then the date is set at seven days (505). If the security is not an MMF then a determination is made as to whether there is a portfolio lending agreement (506). If there is no portfolio lending agreement, then a determination is made as to whether the date is greater than 397 days (517). If the date is not greater than 397 days, then the system uses a stated maturity (518). If the date is greater than 397 days, then the security is ineligible (519).

If there is a portfolio lending agreement (506) then a determination is made as to whether there is a demand (507). If there is no demand, then the system uses the return date of the securities (508). If there is a demand, then the determination is made as to whether the demand is exercisable within thirty days (504). If the demand is exercisable within thirty days, then the system uses the notice period (510). If the demand is not exercisable within thirty days, then a determination is made as to whether the demand feature is exercisable at intervals with thirty days' notice (511). If the demand feature is exercisable at intervals with thirty days' notice, then the system uses the notice period (510). Otherwise, the system uses the return date of the securities (512).

Rule 2a-7 Assumptions

In the preferred embodiment of the invention, all pre-refunded and repo securities are considered to be Government securities and thus exempt from Rule 2a-7.

The Presently Preferred Embodiment of the Invention

The presently preferred embodiment of the invention is comprised of a compliance module which is currently a component of the MIDAS Portfolio Management System, a proprietary fixed-income portfolio management tool developed in-house at Charles Schwab & Co., Inc. of San Francisco, Calif. However, the compliance module was created to exist outside of the MIDAS application and also be used from other systems, e.g. a Web-based compliance checker, or a compliance checker application on a wire-less, hand-held, Palm Pilot type device.

Additionally, the presently preferred embodiment of the invention is architected in such a way that any number of compliance rules may be added, edited, or deleted. These rules do not have to be SEC or IRS rules, their source may be from anywhere. The system is modular so that a minimal amount of effort is needed to insert a new rule into the system. All rules also have start and end dates. These are used by the system so that the system knows when each Rule is applicable. In this way, a Rule can be inserted and tested into the system many months before the rule actually becomes effective. This allows for easy testing of the integrity of the implementation of the rule and also automatically invokes the rule once the proper date is reached. The rule is invoked until the end date entered in the table is reached. In the case of no specification of an end date, the rule will be invoked indefinitely.

All rules are orthogonal, that is the results are independent of the order rules are invoked and any calculations performed by other rules.

Definitions

Several terms are used throughout this document. These are identified in this section and elsewhere, as appropriate.

Trades:

Preliminary

Preliminary trades are considered "scratch paper" trades. They are entered into the system and can be saved with only rudimentary information. Preliminary trades can be checked against compliance rules provided enough information is entered regarding the trade.

Authorized

Trades are subject to a variety of data integrity checks before they become authorized. Additionally, during the Authorization process, the Compliance module is invoked and depending on the outcome of the checks, a trader may choose one of two branches of processing. This is further explained later in this document. Authorized trades create/affect tax lots and can only be canceled with special auditing.

Implementation

The compliance engine is composed of three parts. These parts communicate with each other to perform the compliance testing functionality.

Data:

The data portion of the compliance engine is used for persistence, i.e. maintaining information from session to session and setting parameters for limit calculations. This includes active and inactive dates for rules, the percentage limits for rules and the exposure totals. In the presently preferred embodiment of the invention, database tables are the mechanism to achieve persistence.

Stored Procedures:

Stored procedures are codes that execute at the database server. These typically perform data manipulation and computation and can alter table data and/or return information to the caller. Stored procedures are used heavily in the compliance engine.

Business Layer Code

The business layer is the place where business logic is stored and executed. Functions in the business layer are called by the front-end code and the business layer calls on the data layer as needed. The business layer communicates results back to the front end code, described next.

Front End Code

The front end code is also known as the visual layer. It is here that the user enters requests and inspects results. The front end code calls the business layer, where much of the actual processing is done.

QuickLook (Part of the Front End Code)

QuickLook is used by traders to determine how much room they have for any security group in the group of funds in which they are interested. The trader enters a symbol, or chooses one from a drop down list box or searches for one using a pop-up window. QuickLook sends a request to the business layer that then determines the room that the security group has for each applicable compliance rule by accessing data in the data layer.

This is done for two cases:
considering all trades for the fund (Preliminary and Authorized); and
just authorized trades.

Once the room is determined, the business layer then returns the smallest amount to the interface. Any amount greater than this would cause an exception to a rule. If the trader wants to look at details of individual rules, they can double-click on the fund name and another window opens up, displaying all the values for each rule for that fund. Thus, the trader can see exactly how they fare for each rule.

Trading

Trading compliance uses the same basic mechanism as QuickLook. Trading compliance checks are invoked through two different methods. The user may press a button to check compliance at any time. Also, at authorization time, compliance checks are automatically run. The same basic window is shown in all cases with the exception that during authorization, two extra fields are displayed requiring explanations for any exceptions and allowing the trader to indicate a credit analyst who has given an OK for the exception. In both cases, values are shown for the room available both before and after the trade being considered.

Determination of Exposure

The compliance module disclosed herein looks to each security traded to determine exposure to various financial institutions. The exposure is determined by analyzing the security involved in a trade to determine the entity, type, and amount of exposure for each trade. Any changes to the characteristic of a security automatically cause a recalculation of exposure and an update to the accumulators.

Accumulators

While it is possible to do exposure calculations live every time compliance needs to be checked, it is much more efficient to store the exposure values as trades are entered into the system. This is accomplished through the use of accumulators.

At the data layer, the compliance engine uses table-based accumulators to store information regarding exposure to financial entities.

Tracking Preliminary and Authorized Trades

Because there are two types of trades (preliminary and authorized) the compliance module maintains two sets of accumulators for each set of exposure calculations (see below).

Multiple Accumulators

Different regulatory agencies require different methods of determining exposure. It is entirely possible that the same trade generates different exposure amounts depending upon which rule is being evaluated. To accommodate this, the compliance module maintains several different accumulator tables to track the different exposure calculations. As mentioned above, each of these tables tracks amounts for both preliminary and authorized trades.

Implementing the Rules

Stored Procedures

A large amount of data manipulation is achieved through the use of stored procedures on the database. Each compiled procedure encapsulates a unit of processing used in the compliance checks.

Component Level Code

The business layer is implemented in component level code. The compliance engine is a single component that also encompasses several sub-components. It is at this level that the business functionality of compliance checking is implemented. The compliance engine is called by the user interface and in turn calls the database when necessary.

Independence of Rules (Orthogonality)

It is important to note that all compliance rules are orthogonal, i.e. each is independent of any others and are evaluated independent of any other rule.

Invoking the Rules

Pervasive Rules—Applicable to all Funds

Certain rules and regulations apply to all funds all the time. An example of this type of regulation are the internal credit checks. In this type of rule, the internal credit department approves certain securities for a fund and may set limits of how much exposure a fund can have to any entity. The credit department affects how these rules are implemented by modifying limits or changing approval status. Regardless, the limitations and approvals always apply.

Rules Applicable to Only Some Funds (e.g. 2a-7)

Table-Driven

Other rules only apply to specific funds and thus the system requires a way to specify whether a rule applies to a certain fund or not. The compliance module handles this case by maintaining a database table of funds and compliance checks. An entry in the table indicates that the fund is subject to the rule. Additionally, the table contains start and stop dates, so rules can be installed prior to when they need to activate and can be turned off when they become obsolete. By turning off a rule, but still keeping it the system, the compliance module provides an accurate record of what rules were applicable to which funds and for what time period.

Returning Results

QuickLook

As mentioned earlier, QuickLook returns the room available for two sets of conditions: all (prelim & authorized) trades and auth trades only.

Trading

Compliance checked during trading returns the room available both before and after trade for two sets of conditions: all (prelim & auth) trades and auth trades only.

Handling Exceptions to the Rules

QuickLook

QuickLook is informational only. Exceptions are reported to the user, but QuickLook is not where anything can be done about an exception.

Trading

When a user initiates authorization for a trade and there are no compliance exceptions, authorization proceeds smoothly. If an exception is found, the following chain of events is initiated:

The user is given a chance to back out

If the user opts not to back out then an explanation can be entered and the name of an authorized credit analyst can be entered who has approved a one-off (only applicable for internal credit department rules).

The exception is logged in a special table for review by supervisors. There is also a facility for credit users to verify that they approved the one-off.

Portfolio Management Compliance Rule Specification

Rule Name: Sub-Chapter M

Issuing Agency: Internal Revenue Service

Overview: There are two components to this rule: one regarding income distribution and the other regarding diversification.

1) Income Distribution: This component is outside the scope of portfolio management and is not implemented or enforced in any way in the portfolio management system.
2) Diversification: This component is composed of two parts:
   a) No one issuer may exceed 25% of the fund's Total Asset Value (TAV). Government securities, Mutual fund shares are excepted from this requirement.
   b) The summation of all Government holdings, Mutual Fund shares, cash, CD's, and all issuer holdings that are <=5% of the TAV must be >=to 50% of the TAV.

Mathematically, it looks like this:

$$(\Sigma GovtHoldings + \Sigma Cash + \Sigma CDs + \Sigma MutualFundShares + \Sigma AllOtherHoldingsWhereAmountHeldIs \leq 5\% \text{ of } TAV) \geq 50\% \text{ of } TAV \quad (1)$$

Compliance Rules Applied in the Compliance Module

The following is a list of the compliance rules used in compliance module and a brief description of each rule.

Some general terms that will be useful to know how they are used in this document:

Free Basket—a limit that is an exception to the general limit of a rule. It is another bucket of holdings that is a limit in itself, usually the sum of the holdings of the entities that exceed the general limit.

Total Asset Value (TAV)—This is used as the value that represents the assets of a fund comprised of its holdings.

40 Act

The '40 Act applies to most of the funds managed by the compliance module, but not all. It is sometimes used synonymously with Rule 2a-7, but in actuality, the '40 Act implemented Rule 2a-7. It is made up of three parts:

1. 40 Act: Industry Limit

The fund should not have more than 25% of its holdings in any single industry.

2. 40 Act: Issuer Limit

The fund should not have more than 5% of its holdings in any single issuer. A 25% free basket is available for single state funds.

3. 40 Act Guarantor Limit

The fund should not have more than 10% of its holdings in any single guarantor. A 25% free basket is available for all funds.

Credit Entity Limit

The credit entity limit is an internal limit set up by the credit department. It applies to all entities and is set as the percentage any entity can hold of a fund. It uses the 40 Act method of allocating responsibility for a holding.

Distributing Fund Status

This is a special rule that only applies to offshore funds. It is based only on the holdings of an issuer and limits the holdings of any single issuer to 10% of the funds TAV.

Fund Approval

Fund approval is an internal approval by the credit department that a fund can contain holdings of a specific security. If the security is approved for a fund, the funds TAV is displayed, otherwise a zero is displayed.

Internal Credit Limit

The internal credit limit is an internal limit set up by the credit department. It applies to all entities and is set as the percentage any entity can hold of a fund. It uses the obligor/issuer method of allocating responsibility for a holding. It ignores any credit enhancements.

Sector Limits

Sector limits are set up dynamically. They are set up at the fund level to establish limits of a sector for the fund. This is a percentage of the TAV that a fund can own of the sector. Exposure is set at the security level, indicating the percentage of a security's par that applys to a given sector. Sectors are categorized by a sector type (such as industry, country, Aggregate). There is a special type, known as a super sector, which is composed of multiple sectors.

Sub-Chapter M

This is a limit set up by the Internal Revenue Service. With some specific exceptions, the fund should not have more than 5% of its holdings in any single issuer/obligor. A 50% free basket is available for all funds but any one issuer/obligor can only have 25% of the free basket. Some types of securities are exempt from this rule (such as government securities, CDs, Money Market).

Under 3-Year Limit

This is an internal limit set up by the credit department. It is set at the entity level and is used to track entities that have only existed for less than three years. It limits the holdings of an entity that has existed for less than 3 years to 5% of a funds TAV.

Compliance Rules Details

The following discussion provides the details of each of the compliance rules. It describes where the information is maintained in portfolio management to administer the rules as well as which accumulators are used to sum the holdings for each rule. How each accumulator is updated is described in a following section.

External compliance rules are applied to funds as appropriate. The fund compliance rule is set up in the fund compliance table for the funds to which a rule applies. Internal compliance rules apply to all funds.

If a security is a piece of a program (a security with a security group), the program's data (security group) is used to determine the security's distribution of exposure.

40 Act

The 40 Act implements an entity level compliance rule. There are three components, which are discussed separately. All 40 Act compliance rules are external rules.

40 Act: Industry Limit

The 40 Act industry limit uses industry sector distribution for each security to determine a funds holdings for any given industry. The compliance object looks at the amount of holdings for each industry sector set up for a security.

The TAV for a fund is multiplied by 25% to determine the industry limit. The room available to purchase a security is the fund industry limit minus the current holdings of a fund in that industry. If it is a positive number, it represents the room available to purchase of the security. If it is zero or a negative number, there is no room available to purchase the security because the industry limit has been used up.

User Maintenance—Security industry allocation is maintained in the security window on the sector tab. The maintenance screen allows the user to indicate the percentage of a security's holding to accumulate in each sector set up for the security. The 40 Act industry limit only looks at the sectors with a type of industry.

Technology Maintenance—The fund 40 Act Industry limit of 25% of the TAV is adjustable in the program. This is done to allow for slight margins of error, e.g., the limit may actually be set to 24.95%. The fund compliance rule is set up in the fund compliance table for the funds to which it applies.

40 Act: Issuer Limit Versus Guarantor Limit

When the 40 Act limit is determined, the compliance object looks to see whether to use the Issuer limit or the guarantor limit for the security.

If the guarantor exposure is equal to or greater than 100% (when adding up the percentage assigned to the guarantors and Escrow to Maturity—ETMs) then the compliance object uses the guarantor limit, otherwise it uses the issuer limit to determine the 40 Act limits.

To understand how the entity exposure is determine for a security using the 40 Act, please see the discussion below named Accumulator Fund Entity.

40 Act: Issuer Limit

The 40 Act issuer limit uses entity exposure to determine a funds holdings for any given entity. The compliance object looks at the amount of holdings for each entity set up for a security.

When determining the total holdings of an entity using the issuer rule for a fund, the entity's holdings that are held as an Issuer, Obligor, CDF, Controlled Person Guarantee, Issuer CDF, and Issuer Guarantee are aggregated.

The TAV for a fund is multiplied by the issuer percentage set up on the fund table to determine the issuer limit. Currently this is set at 4.9% for all funds, although other percentage may be applied. The room available to purchase a security is the fund issuer limit minus the current holdings of the entity being processed.

If the fund is a single state fund, the issuer free basket is also checked. The issuer free basket is set up in the fund table and is currently set at 24.9%. The fund's TAV is multiplied times the issuer free basket percent to determine the fund's free basket limit.

The total holdings of all entities using the issuer free basket for the fund are accumulated. The room available to purchase a security using the free basket is the fund issuer free basket limit minus the sum of the holdings in the issuer free basket.

When determining the 40 Act issuer limit, either the normal issuer limit or the issuer free basket limit is used which ever is the higher value.

If it is a positive number, it represents the room available to purchase of the security. If it is zero or a negative number, there is no room available to purchase the security since the issuer limit has been used up.

User Maintenance—The entity distribution of exposure for a security is maintained in the Security window. The Issuer and Obligor(s) are set up in the Attribute 1 tab. Guarantors and other credit enhancements are set up in the Credit Enhancement tab of the window. Is this level of detail necessary?

Technology Maintenance—The fund 40 Act Issuer limit of 4.9% and the issuer free basket limit of 24.9% are maintained in the fund table. The fund compliance rule is set up in the fund compliance table for the funds to which it applies.

40 Act: Guarantor Limit

The 40 Act guarantor limit uses entity exposure to determine a funds holdings for any given entity. The compliance object looks at the amount of holdings for each entity set up for a security.

When determining the total holdings of an entity using the guarantor rule for a fund, the entity's holdings that are held as an Issuer, Obligor, CDF, General Guarantee, and controlled person guarantee are aggregated.

The TAV for a fund is multiplied by the guarantor percentage set up on the fund table to determine the guarantor limit. Currently this is set at 9.9% for all funds. The room available to purchase a security is the fund guarantor limit minus the current holdings of the entity being processed.

The guarantor free basket is also checked for all funds. The guarantor free basket is set up in the fund table and is currently set at 24.9%. The fund's TAV is multiplied times the guarantor free basket percent to determine the fund's free basket limit.

The total holdings of all entities using the guarantor free basket for the fund are accumulated. The room available to purchase a security using the free basket is the fund guarantor free basket limit minus the sum of the holdings in the guarantor free basket.

When determining the 40 Act guarantor limit, either the normal guarantor limit or the guarantor free basket limit is used which ever is the higher value.

If it is a positive number, it represents the room available to purchase of the security. If it is zero or a negative number, there is no room available to purchase the security since the guarantor limit has been used up.

User Maintenance—The entity distribution of exposure for a security is maintained in the Security window. The Issuer and Obligor(s) are set up in the Attribute 1 tab. Guarantors and other credit enhancements are set up in the Credit Enhancement tab of the window. If a security is a piece of a program, the program's data is used to determine the security's distribution of exposure.

Technology Maintenance—The fund 40 Act guarantor limit of 9.9% and the guarantor free basket limit of 24.9% are maintained in the fund table. The fund compliance rule is set up in the fund compliance table for the funds to which it applies.

Credit Entity Limit

The credit entity limit is a credit department limit and is an entity level compliance rule. The Accumulator Fund Entity is used to determine an entity's holdings for any given fund. To understand how the entity exposure is determined for a security, please see the discussion below named Accumulator Fund Entity.

To determine the credit entity limit for any entity for any fund, the compliance object checks if the entity limit is set up as a dollar amount or a percentage of the fund. If a dollar amount exists, that is the limit for the entity, otherwise the TAV of a fund is multiplied by the entity percentage set for the fund for the entity. If no fund entity limit is set up for the entity for the fund, the limit is set to zero.

The room available to purchase a security is the fund entity limit minus the current holdings of the entity being processed in the fund. If it is a positive number, it represents the room available to purchase of the security. If it is zero or a negative number, there is no room available to purchase the security since the credit entity limit has been used up.

User Maintenance—The entity limit for each fund is set up on the Entity window. The Fund Entity Limits tab is used to set up the limit either as a percentage or a dollar amount limit.

Technology Maintenance—None.

Distributing Fund Status

The Distributing Fund Status limit is an external limit that only applies to offshore funds. The Accumulator Issuer Fund Entity is used to determine an entity's holdings for any given fund. To understand how the entity exposure is determined for a security, please see the discussion below named Accumulator Issuer Fund Entity. As the name implies, it only accumulates holdings at the issuer level.

The TAV for a fund is multiplied by the distributing fund status limit percentage set up on the fund table to determine the limit. Currently this is set at 10% for the fund to which the rule applies. The room available to purchase a security is the distributing fund status limit minus the current holdings of the issuer of the security.

If it is a positive number, it represents the room available to purchase of the security. If it is zero or a negative number, there is no room available to purchase the security because the distributing fund status limit has been used up.

User Maintenance—The Issuer of a security is set up on the Attribute 1 tab of the security window.

Technology Maintenance—The distributing fund status percentage limit is set on the fund table for the fund. The fund compliance rule is set up in the fund compliance table for the funds to which it applies.

Fund Approval

The fund approval is a credit department approval. It is not really a limit but is an indicator that represents that the security is approved for a particular fund.

If a security is approved for a fund, the TAV of the fund appears as the limit for the rule. This offers a display of the TAV for traders in the compliance windows. If the security is not approved for a fund, the fund approval appears as a zero.

User Maintenance—The fund approval is set for each security in the Fund tab of the Security window.

Technology Maintenance—None.

Internal Credit Limit

The internal credit limit is a credit department limit and is an entity level compliance rule. The accumulator credit fund entity is used to determine an entity's holdings for any given fund. To understand how the entity exposure is determined for a security, please see the discussion below named Accumulator Credit Fund Entity.

The only difference between credit entity limit and internal credit limit is the accumulator used to determine current holdings. In general, credit entity limit uses the entity accumulator used for the 40 Act, which includes guarantors, whereas the internal credit limit uses an accumulator that only looks at obligors and issuers.

To determine the credit entity limit for any entity for any fund, the compliance object checks if the entity limit is set up as a dollar amount or a percentage of the fund. If a dollar amount exists, that is the limit for the entity, otherwise the TAV of a fund is multiplied by the entity percentage set for the fund for the entity. If no fund entity limit is set up for the entity for the fund, the limit is set to zero.

The room available to purchase a security is the fund entity limit minus the current holdings of the entity being processed in the fund. If it is a positive number, it represents the room available to purchase of the security. If it is zero or a negative number, there is no room available to purchase the security since the credit entity limit has been used up.

User Maintenance—The entity limit for each fund is set up on the Entity window. The Fund Entity Limits tab is used to set up the limit either as a percentage or a dollar amount limit.

Technology Maintenance—None.

Sector Limits

Sector limits are a dynamic way for the credit department to set up any type of limits they desire. There are some specific limits that are set up for each fund, but the sector limits can be set up so that any kind of limit can be set up for any fund.

Sector limits are set up based on three basic components:

Sectors are set up using the sector windows. A sector has a code, a description and a sector type. There is a separate window that can be used to set up sector types. Some limits are based on sector types but the dynamic limits only use sectors. In addition sectors can be grouped together to make up super sectors (supersets of sectors) dynamically.

Sectors are assigned to a security. When a sector is assigned to a security, a percentage is also entered. This percentage is the amount of any holding of the security that will aggregate as exposure by that security and fund to the sector.

Sectors are assigned to funds. When a sector is assigned to a fund a percentage is also entered. The percentage is the limit that a fund can hold of the assigned sector. The percentage is multiplied by the TAV of the fund to determine the dollar limit that a fund can hold of that sector.

There are three sector type limits that are built into the system. These are hard coded and are not able to change dynamically. When processing sectors that are assigned to theses sector types, the sector within the sector type with the least room is the one reported as the limit for the sector type.

The three sector types are:

Industry sector type

Aggregate sector type

Super sector types with names that begin with 'Asset-backed Security'

There is one additional special type of sector called a Super Sector. Super Sectors are a grouping of sectors. When determining a limit for Super Sector, there is an option indicating if the sectors in the super sector are processed using 'or' logic versus 'and' logic. In the case of 'or' logic, if one of the sectors in the super sector is assigned to a security, the super sector applies to the security as a limit. In the case of 'and' logic, all of the sectors in the super sector must be assigned to the security for the super sector to limit to apply to the security.

The room available to purchase a security is the fund sector limit minus the current holdings of the sector being processed in the fund. If it is a positive number, it represents the room available to purchase of the security. If it is zero or a negative number, there is no room available to purchase the security since the credit entity limit has been used up.

User Maintenance—The sector limit as a percent of the fund for each fund is set up on the Sector tab of the Fund window. The security exposure in each sector is set up in the Sector tab of the Security window. There are windows to set up Sectors, Sector Types and Super Sectors.

Technology Maintenance—None.

Sub-Chapter M

The Sub-Chapter M limit is an external limit set by the IRS. The Accumulator Credit Fund Entity is used to determine an entity's holdings for any given fund. To understand how the entity exposure is determined for a security, please see the discussion below named Accumulator Credit Fund Entity.

The TAV for a fund is multiplied by the Sub-Chapter M Issuer limit percentage set up on the fund table to determine the limit. Currently this is set at 4.9% for the fund to which the rule applies. The room available to purchase a security is the Sub-Chapter M limit minus the current holdings of the issuer/obligor of the security.

Sub-Chapter M also has a free basket. The Sub-Chapter M free basket is currently set to 49.9% of the fund, which is set in the fund table. There is an additional issuer limit for the Sub-Chapter M free basket. It is an issuer/obligor limit for the Sub-Chapter M free basket, which is currently set at 24.9% of the fund. This means that although the free basket size for Sub-Chapter M of 49.9% of the fund, any single issuer/obligor can only have a 24.9% exposure in the fund.

The total holdings of all entities using the Sub-Chapter M free basket for the fund is accumulated. The room available to purchase a security using the free basket is the fund Sub-Chapter M free basket limit minus the sum of the holdings in the Sub-Chapter M free basket.

If this amount is greater than the issuer/obligor free basket limit, the issuer/obligor free basket limit becomes the free basket limit.

When determining the Sub-Chapter M limit, either the normal issuer/obligor limit or the Sub-Chapter M free basket limit is used, which ever is the higher value.

If it is a positive number, it represents the room available to purchase of the security. If it is zero or a negative number, there is no room available to purchase the security since Sub-Chapter M Limit has been used up.

Please Note: There is an exception to the Sub-Chapter M rule which has not been coded. Holdings that are government holdings, cash, CDs and mutual fund shares should not be included when determining the portion of the free basket that has been used. Because the funds using the Sub-Chapter M rule have minimum holdings in these types of securities, it is not currently a problem.

User Maintenance—The Issuer and obligor of a security is set up on the Attribute 1 tab of the security window.

Technology Maintenance—The Sub-Chapter M percentage limits are set on the fund table for the fund. The Fund Compliance rule is set up in the fund compliance table for the funds to which it applies.

Under 3-Year Limit

The Under 3-Year limit is a credit department limit and is an entity level compliance rule. The Accumulator Int Fund Entity is used to determine an entity's holdings for Under 3-Year Limit. To understand how the Under 3-Year limit exposure is determined for a security, please see the discussion below named Accumulator Int Fund Entity.

The Under 3-Year limit only applies to entities that have the Operating History Relevant flag checked and have a Date Founded entered.

The room available to purchase a security is the Under 3-Year limit percent set in the fund table times the TAV for the fund. The entities current exposure in the fund is subtracted from the derived entity limit. If it is a positive number, it represents the room available to purchase of the security. If it is zero or a negative number, there is no room available to purchase the security because the Under 3-Year limit has been used up.

User Maintenance—The Operating History Relevant flag and the Date Founded is set in the Trading tab of the Entity window.

Technology Maintenance—The Under 3-Year percentage limits are set on the fund table for the fund.

Accumulator Details

The following discussion provides the details of each accumulator used in the compliance module to administer the compliance rules. It describes what portion of a holding to accumulate in each of the accumulators. The accumulators are all keyed by fund ID as the high level key.

Accumulator Fund Entity

This is the most complex of the accumulators and is used for the 40 Act issuer and guarantor limits and for the credit entity limit. The distribution of the exposure of each security is based on the combination of the credit enhancements, obligor(s) and issuer assigned to each security. Some security types are exempted from this accumulator for the 40 Act.

The following is pseudo code that describes the way the accumulator aggregates the exposure for each security's holdings.

First a determination is made to see if the security is exempt from the 40 Act. If it is exempt, the system still accumulates the data, but indicate that the entity's exposure is exempt. The security is exempt from the 40 Act if:

The security type is set to 'Repo'
   The Issuer entity record has the 'Treasury' flag checked
      The Issuer entity record has the 'Agency' flag checked
      The Security has a Pre-Refund date Credit Enhancements To determine the distribution of the security's holdings for the accumulator, the process first looks to the credit enhancements set up for the security. It determines the support type for each entity in the credit enhancement tab of the Security window. If there are no credit enhancements, this step is skipped.

```
If the support type is set to 'E'
    Set the support association to 'ETM' -- Escrow to
Maturity
    Otherwise
    If the support type is set to 'C' -- Conditional
        If the issuer is equal to the credit enhancement entity
            Set the support association to 'ICDF' -- Issuer
                Conditional Demand Feature
        Otherwise
            Set the support association to 'CDF'     --
                Conditional Demand Feature
        Otherwise -- Not conditional, check for controlled person
            If the controlled person flag is not set to 'Y'
                Set the support association to 'GG'     --
                    General Guarantee
            Otherwise -- Check if guarantee is from issuer
                If the issuer is equal to the credit enhancement
                    entity
                    Set the support association to 'IG'     --
                        Issuer Guarantee
                Otherwise
                    Set the support association to 'CPG'     --
                        Controlled Person Guarantee
```

After the association is determined the process updates the accumulators with the exposure for the entity using the holding's fund ID and multiplies the holding par amount with the percentage set for each credit enhancement. Entities with an association of 'ETM' are not accumulated.

Obligor(s)

If there are no credit enhancements or the sum of the percentages of the credit enhancements that are have an association of 'ETM' or 'GG' are not equal to or greater than 100 percent, the process looks to the obligor(s) to determine a security's exposure.

For each obligor set up for the security, the process updates the accumulators with the exposure for the entity using the holding's fund ID and multiplies the holding par amount with the percentage set for each obligor.

Issuer

If there are no credit enhancements or obligor(s), or the sum of the percentages of the credit enhancements that are have an association of 'ETM' or 'GG' plus the sum of obligor(s) percentages are not equal to or greater than 100 percent; the process looks to the issuer to determine a security's exposure.

If there are credit enhancements and/or obligor(s), the percentage used to determine the issuer's exposure is 100% minus the sum of the percentages for credit enhancements that are have an association of 'ETM' or 'GG' and obligor(s).

If there were no credit enhancements or obligors, the issuer exposure is set to 100%.

The process updates the accumulators with the exposure for the issuer using the holding's fund ID and multiplies the holding par amount with the percentage set for the issuer.

Accumulator Credit Fund Entity

In this accumulator the distribution of the exposure of each security is based on the combination of the obligor(s) and the issuer assigned to each security. This accumulator is used in processing the internal credit limit and in processing the Sub-Chapter M limit.

Obligor(s)

For each obligor set up for the security (usually only one), the process updates the accumulators with the exposure for the entity using the holding's fund ID and multiplies the holding par amount with the percentage set for each obligor.

Issuer

If there are no obligor(s), or the sum of obligor(s) percentages are not equal to or greater than 100 percent; the process looks to the issuer to determine a security's exposure.

If there are obligor(s), the percentage used to determine the issuer's exposure is 100% minus the sum of the percentages the obligor(s).

If there were no obligors, the issuer exposure is set to 100%.

The process updates the accumulators with the exposure for the issuer using the holding's fund ID and multiplies the holding par amount with the percentage set for the issuer.

Accumulator Fund Sector

In this accumulator the distribution of the exposure of each security is based on the sectors that are assigned to the security. The process updates the accumulators with the exposure for each sector using the holding's fund ID and multiplies the holding par amount with the percentage set for each sector assigned to the security. This accumulator is used in processing all sector limits and the 40 Act Industry limit.

Accumulator Int Fund Entity

This accumulator is unique because it's processing is dependent on the processing of another accumulator. If in the process of determining entity exposure in the accumulator fund entity, some exposure is found to be to the issuer, the holding is accumulated at 100 percent in this accumulator as well using the issuer as the entity ID. This accumulator is used for processing the debt class limit and the Under 3 Year limit.

Accumulator Issuer Fund Entity

This accumulator is only looks to the issuer of each security. For each security, the holding is accumulated at 100 percent using the issuer as the entity ID. This accumulator is only used by the distributing fund status limit.

Compliance Checks

Aggregate Compliance Checks

These checks are just another sector check of sector_type: Aggregate. However, we want to break these out separately for the QuickLook window. These go under the Aggregate heading.

Industry Limit Check

This check is part of the 2a-7 checks so it should be included in that object. It is very simple:

No fund can be invested in a single industry at >25% of its TAV.

For QuickLook, the system should only report on the industries of which the security group of interest is a part.

ABS (Asset Backed Security) Checks

This check is a specific type of Industry check. ABS securities are considered industries by the Board of Directors of Charles Schwab Investment Management, Inc. However, taxable traders need to see the ABS securities broken out separately.

The current ABS sectors are set forth in Table 1 below.

TABLE 1

Current ABS Sectors

| sector_code | sector_description |
| --- | --- |
| ABS-AIRPLA | Asset-Backed Security - Airplanes |
| ABS-AUTO | Asset-backed Security - Auto Receivables |
| ABS-CRCARD | Asset-backed Security - Credit Card Receivables |
| ABS-DIVFIN | Asset-backed Security - Diversified Fin. Assets |
| ABS-HEL | Asset-Backed Security - Home Equity Loans |
| ABS-MORTG | Asset-backed Security - Mortgages |
| ABS-TRADE | Asset-backed Security - Trade Receivables |

Portfolio Management Compliance Rule Specification

Rule Name: Distributing Fund Status

Overview: This rule currently applies to a new Off-Shore fund only, but may apply to other funds in the future.

The basic rule states that no more than 10% of a fund's total asset value (TAV) may reside with any one issuer.

Details: As in the other rules, this rule has exceptions and definitions.

Exceptions:

Repos

Currently, there are no other exceptions.

DEFINITIONS

Issuer: Unlike all other rules, this is straightforward. The rule only looks at the issuer. It completely ignores all enhancers and obligors.

Aggregation: The system ignores issuer aggregation for this rule. That is, if Entity A and Entity B are both issuers of two different securities and they both are owned by Entity C, still consider their exposure separately and do not report exposure to Entity C, for this rule only.

EXAMPLES

Figure 6:
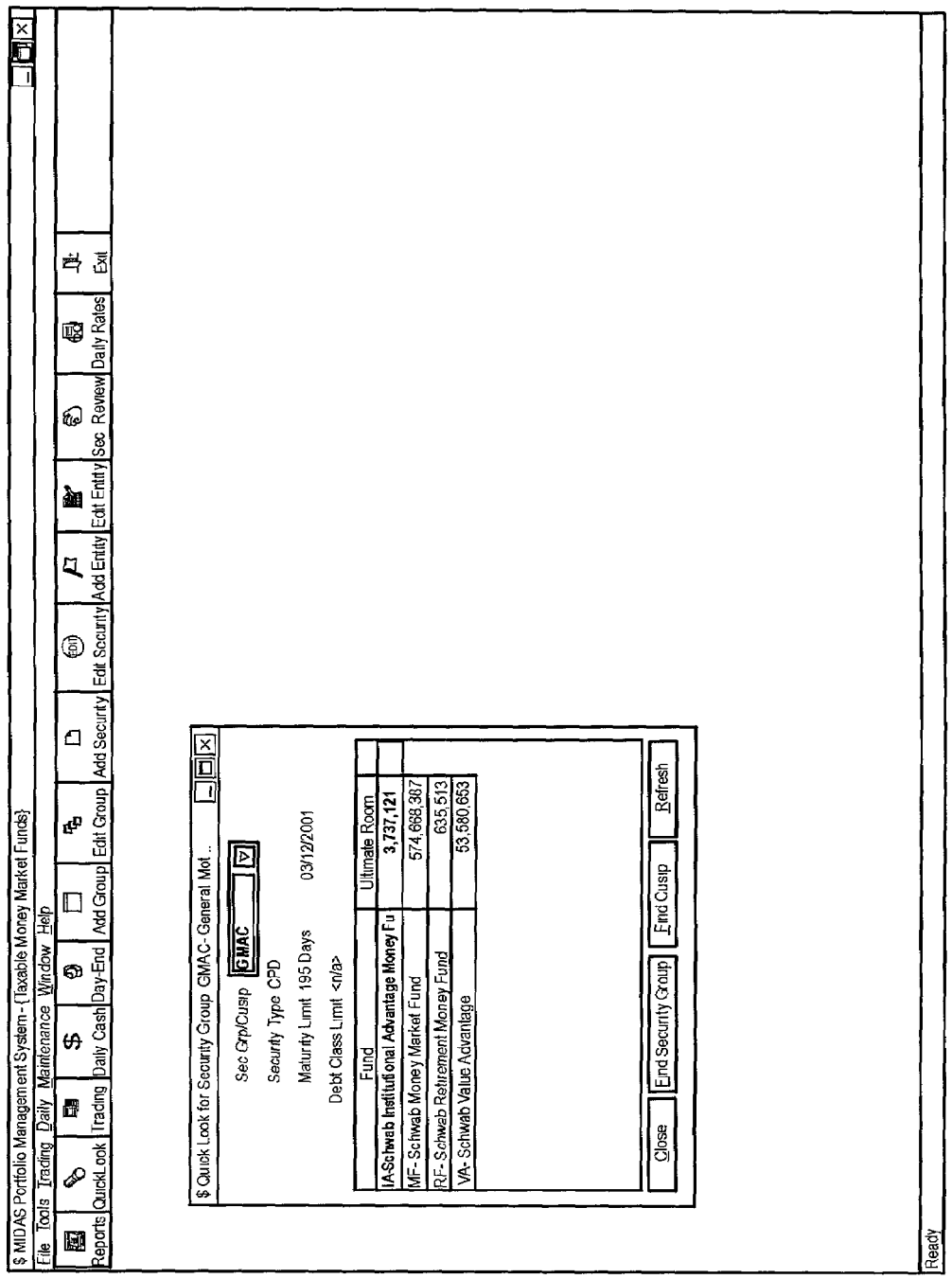
FIG. 6 is a printscreen of the Quick Look window of the compliance module according to the invention.

FIG. 6 is a printscreen of the Quick Look window of the compliance module. Quick Look is used by the traders to determine what quantity of a security they can buy before hitting any compliance issues. The highlighted fund shows room for only $3.7 million dollars.

Figure 7:
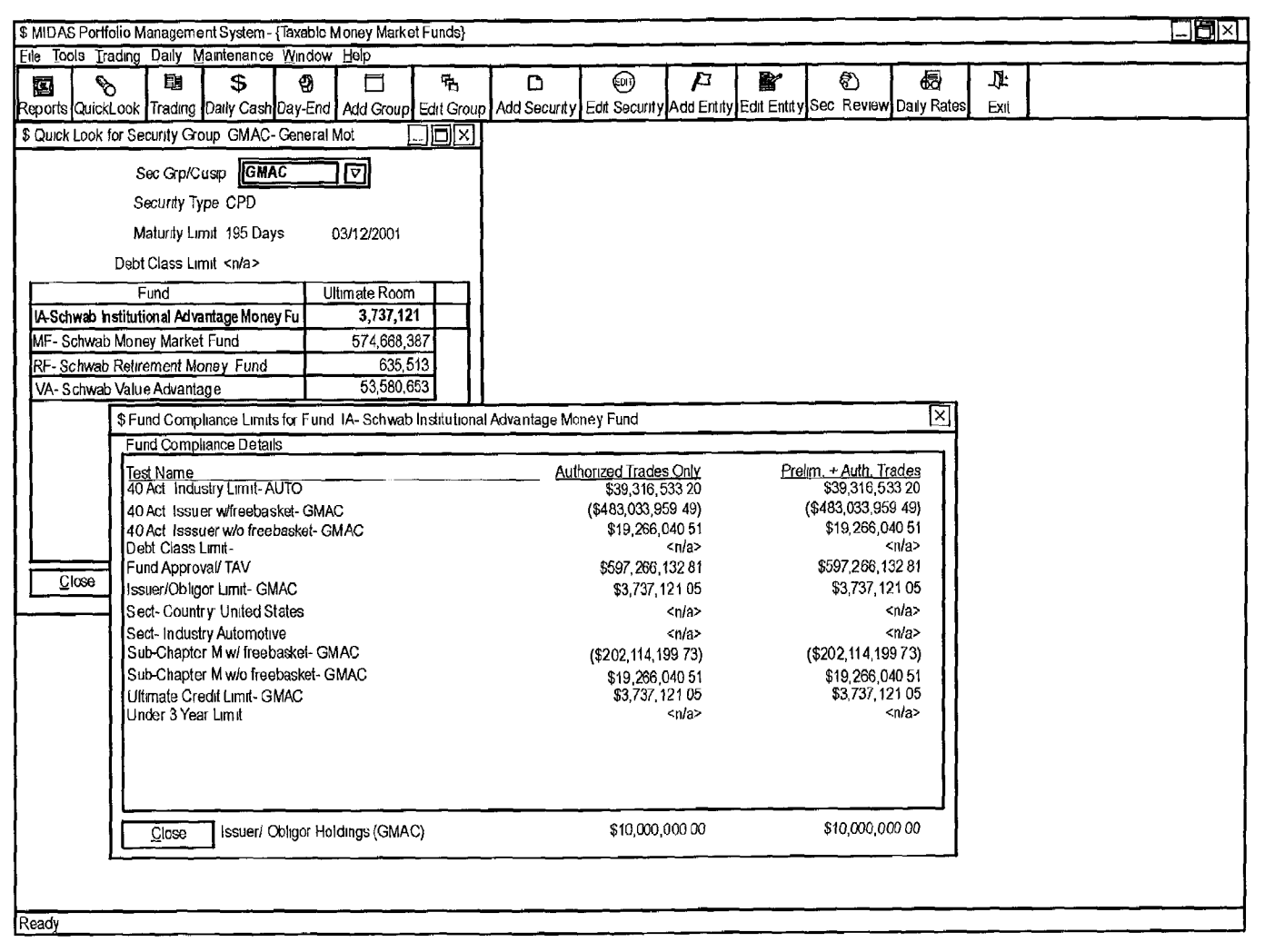

FIG. 7 is a printscreen that displays a detail window activated when the trader double-clicks a fund in the Quick Look window to see details of the rules applied and each of their limits. There are two columns for each rule. The first column considers only trades that have been authorized by a trader, while the second column displays values when preliminary trades are also considered. Notice that there are two rules that display that the fund is already over a limit. This is due to the fact that the funds shown here do not use this provision of the rule.

Figure 8:
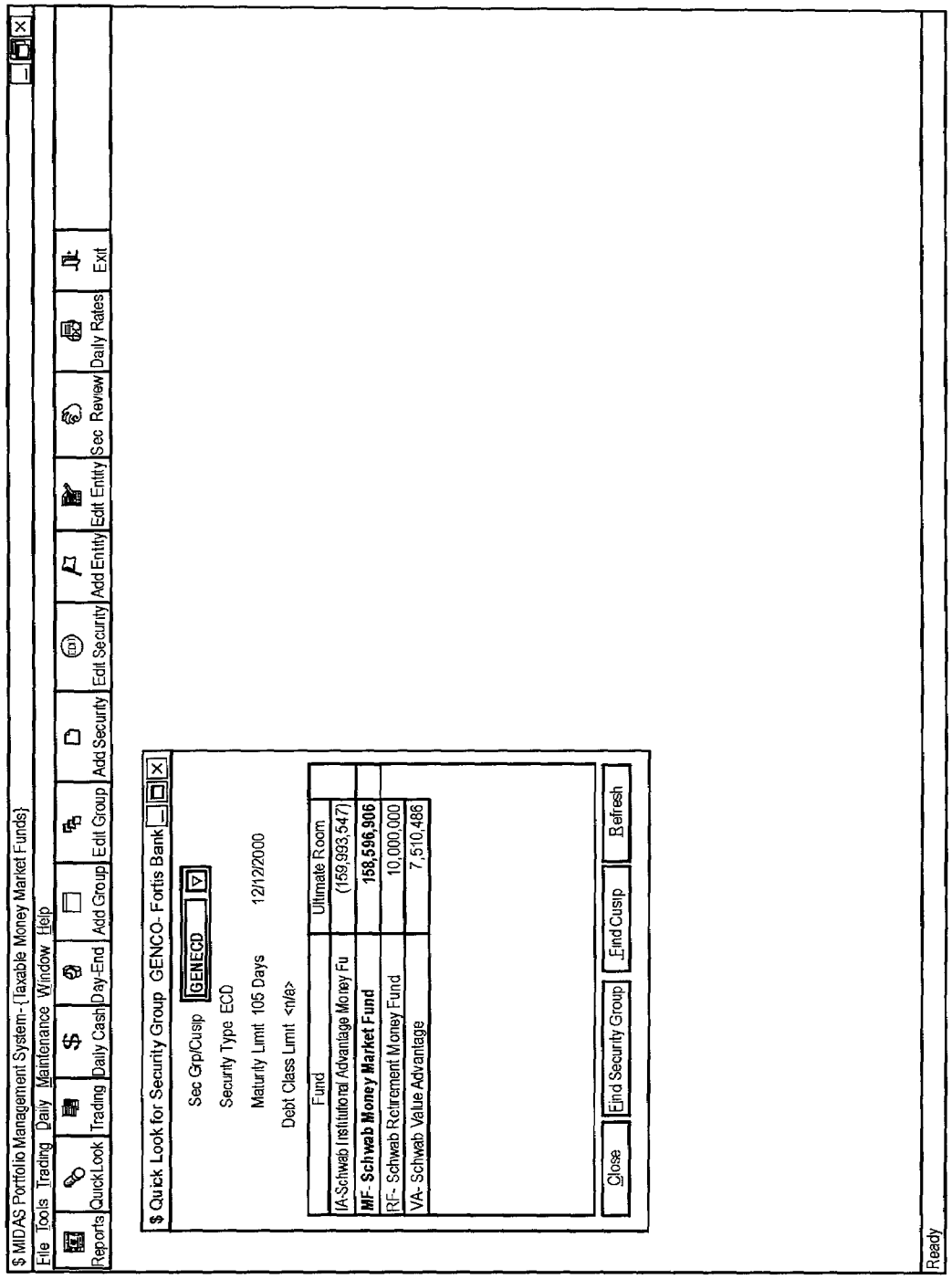
FIG. 8 is a printscreen that displays a Quick Look window for a different security according to the invention.

FIG. 8 is a printscreen that displays a Quick Look window for a different security. The first fund listed is already over the limit for this security (denoted by parentheses).

Figure 9:
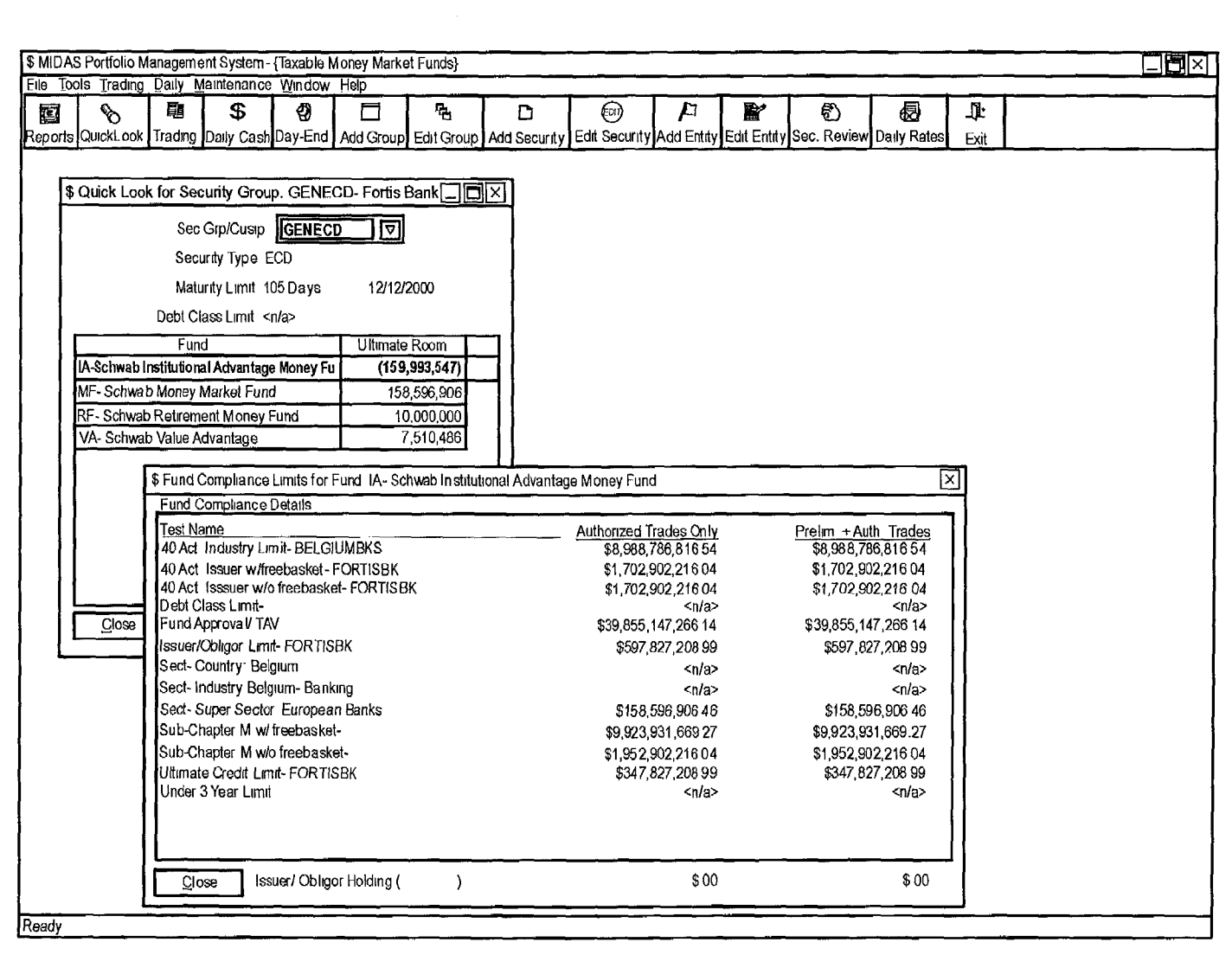

The user can double click on the fund to see the detail window of FIG. 9 identifying exactly which rule is causing the problem. In this case, it is a sector limit, which is imposed by a user's internal risk management department and thus, it is possible that the trader can request a "one-off" on this security and be able to execute the trade.

Figure 10:
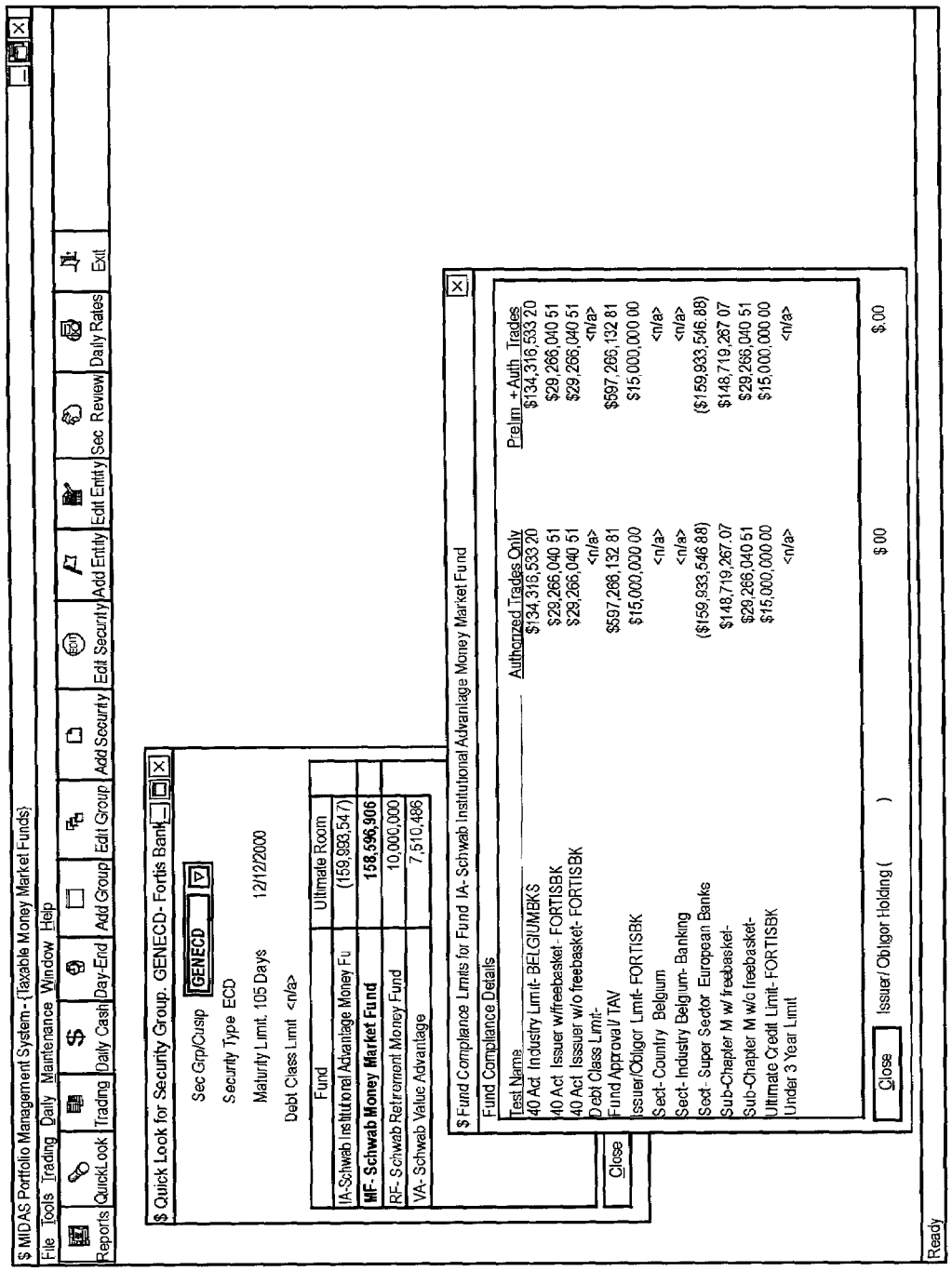
FIG. 10 is a printscreen that shows the detail window for a different fund on the list that does not have any limits exceeded according to the invention.

FIG. 10 is a printscreen that shows the detail window for a different fund on the list that does not have any limits exceeded. The trader uses this window to determine which rule is limited the trade and can then make decisions as to how to better manage their portfolio.

Figure 11:
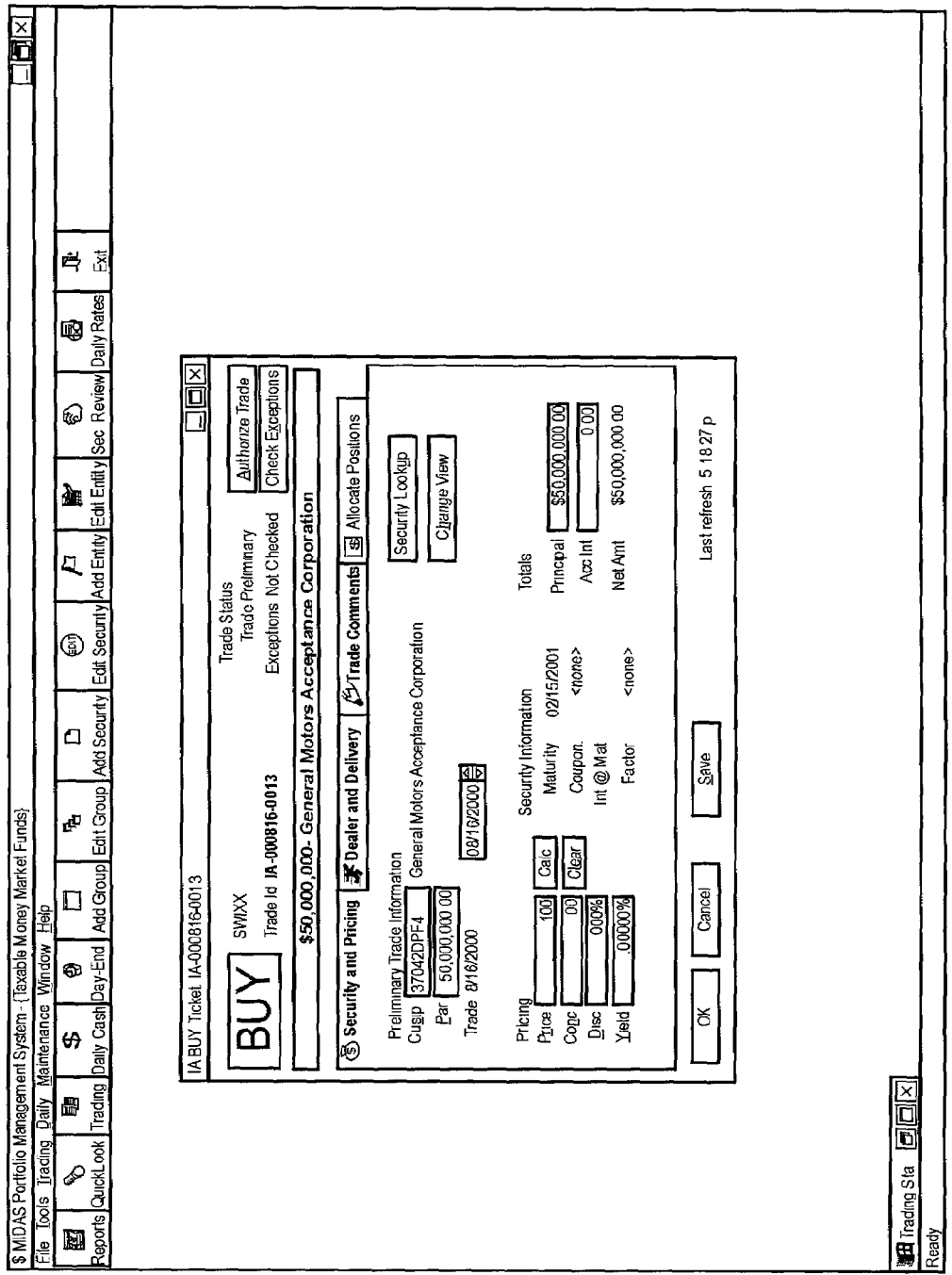
FIG. 11 is a printscreen that displays a trade ticket in the compliance module according to the invention.

FIG. 11 is a printscreen that displays a trade ticket in the compliance module. This is the window traders use to enter their trades into the system. In the upper right corner of the ticket notice the status of the ticket: it is a preliminary ticket and compliance exceptions have not yet been checked.

Figure 12:
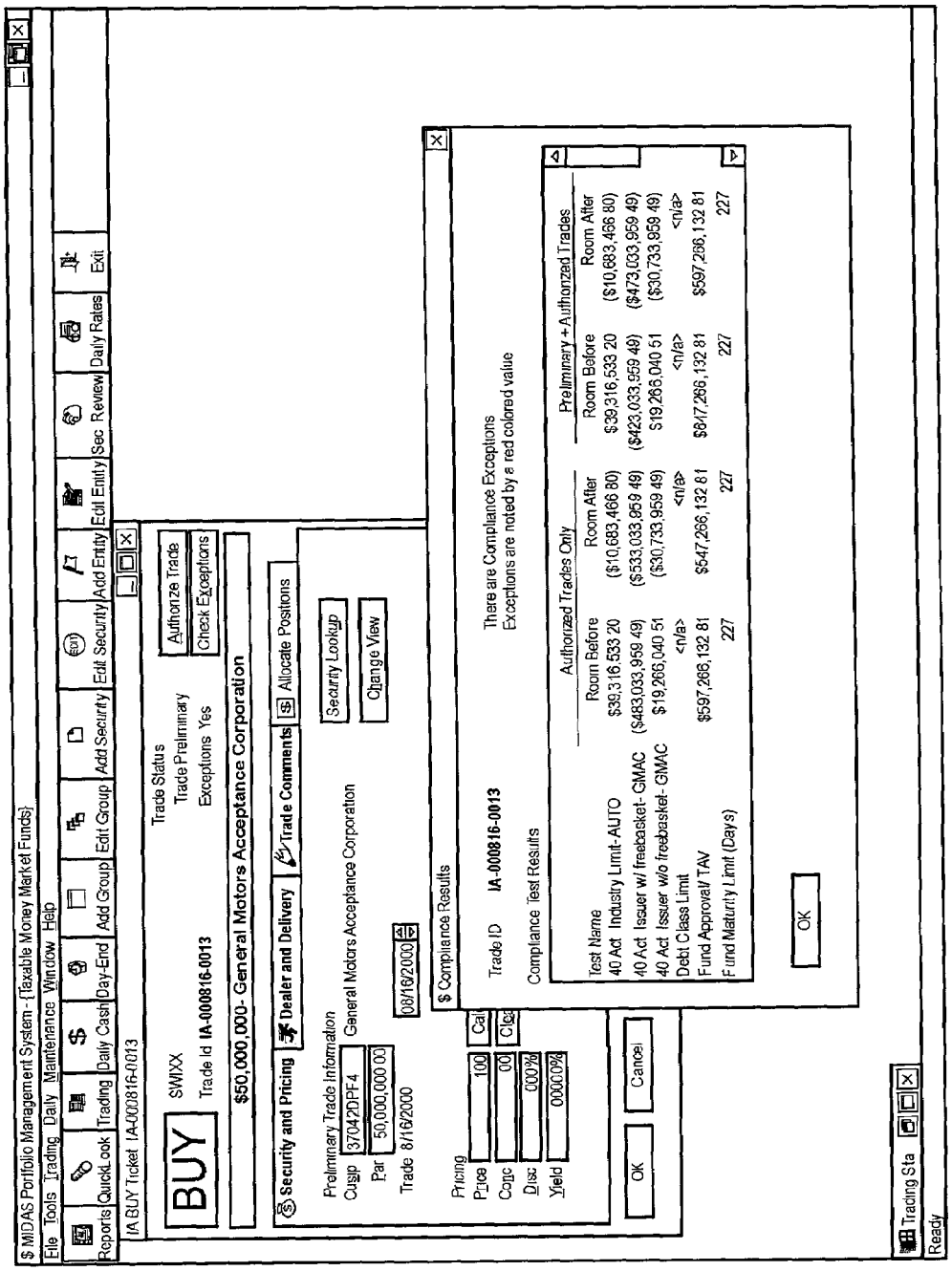
FIG. 12 is a printscreen showing the Compliance Results window showing the rules tested and the results according to the invention.

By pressing the [Check Exceptions] button (upper right), the trader can determine if this trade has any compliance exceptions. In this case it does and the Compliance Results window is displayed (FIG. 12), showing the rules tested and the results. Unlike Quick Look, results are displayed in four columns. The first set of two columns displays compliance limits considering only authorized trades. It displays results for all rules both before and after the current trade is considered. The second set of columns displays similar results when both Authorized and Preliminary trades are considered.

Figure 13:
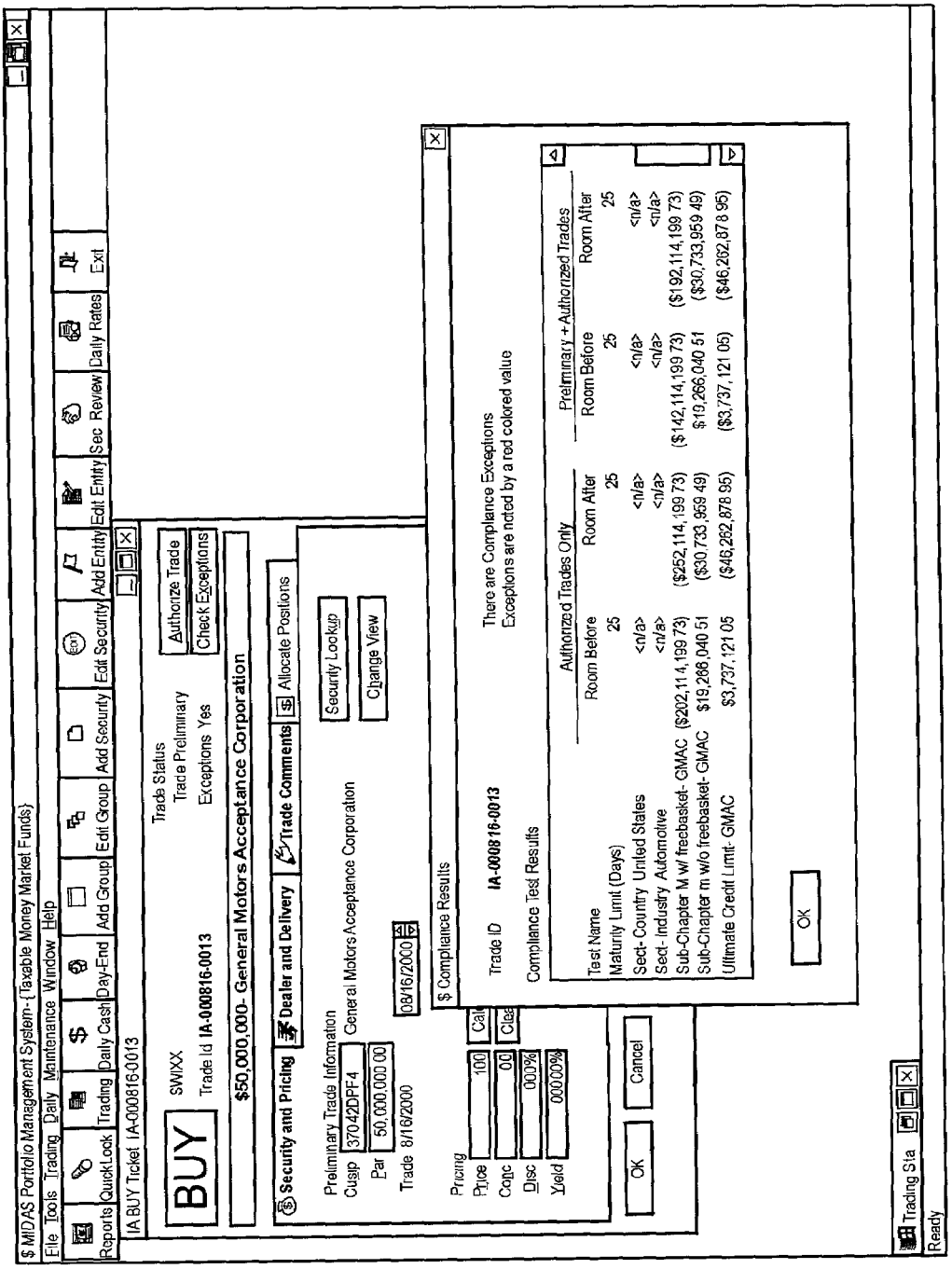
FIG. 13 is a printscreen showing a next screen displays more rules after the window has been scrolled according to the invention.

There are more rules than can fit in the window, so the next screen (FIG. 13) displays more rules after the window has been scrolled.

Figure 14:
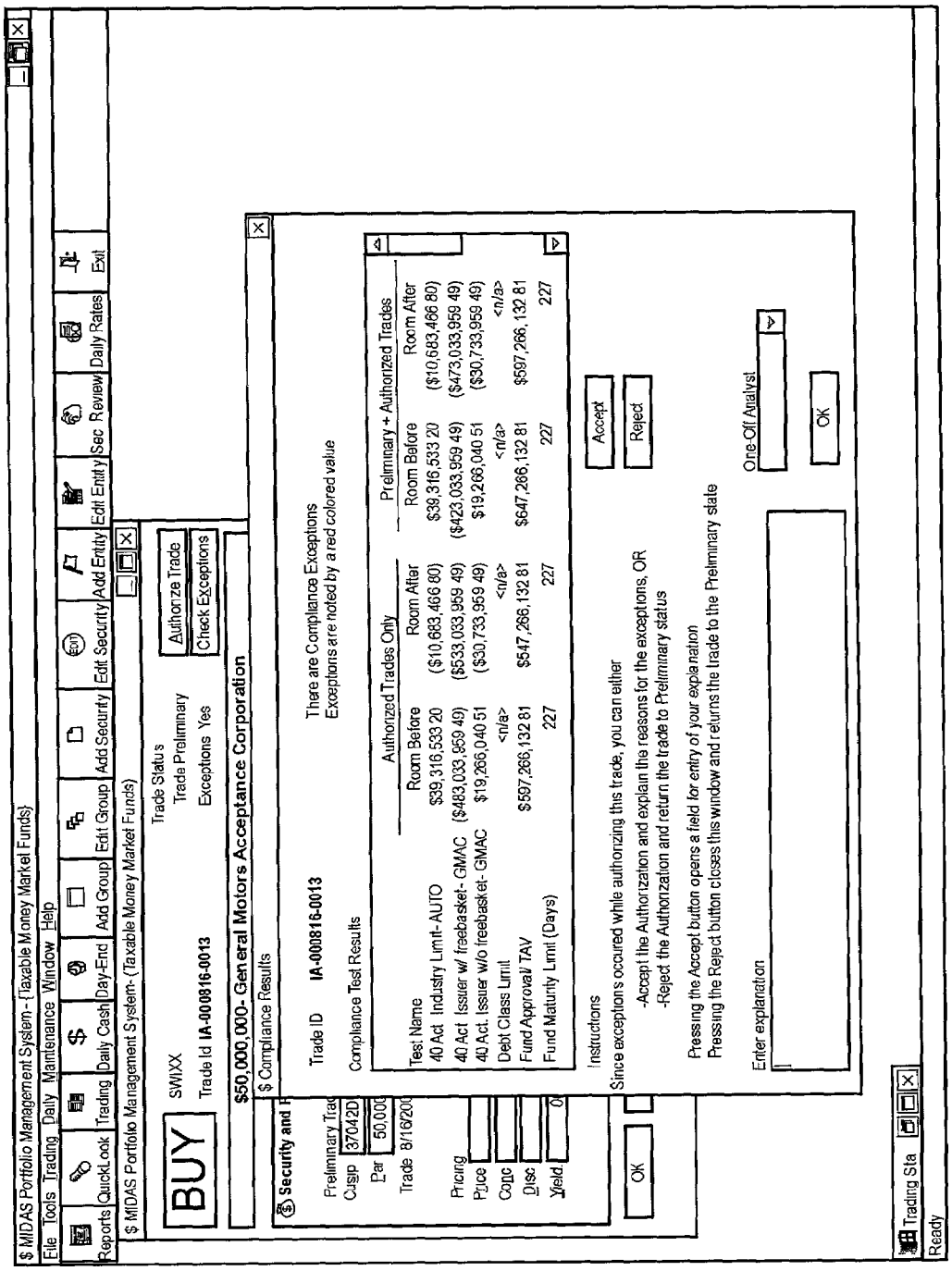
FIG. 14 is a printscreen showing that extra options are available if there are any compliance exceptions according to the invention.

When the trader authorizes a ticket, compliance checks are run automatically, and a window (FIG. 14) very similar to the one above is shown, but this time extra options are available if there are any compliance exceptions. If there are no exceptions, the trade is authorized and the window below is not shown. If there are exceptions, the trader must decide whether to proceed or back out (Accept or Reject the trade). Rejecting closes the Compliance Results window and leaves the ticket in a preliminary state. The trader may then modify or delete the ticket. If the trade accepts the trade, he must enter an explanation for proceeding and, optionally, enter the name of a Credit Analyst who provided a "one-off" on the exception.

Figure 15:
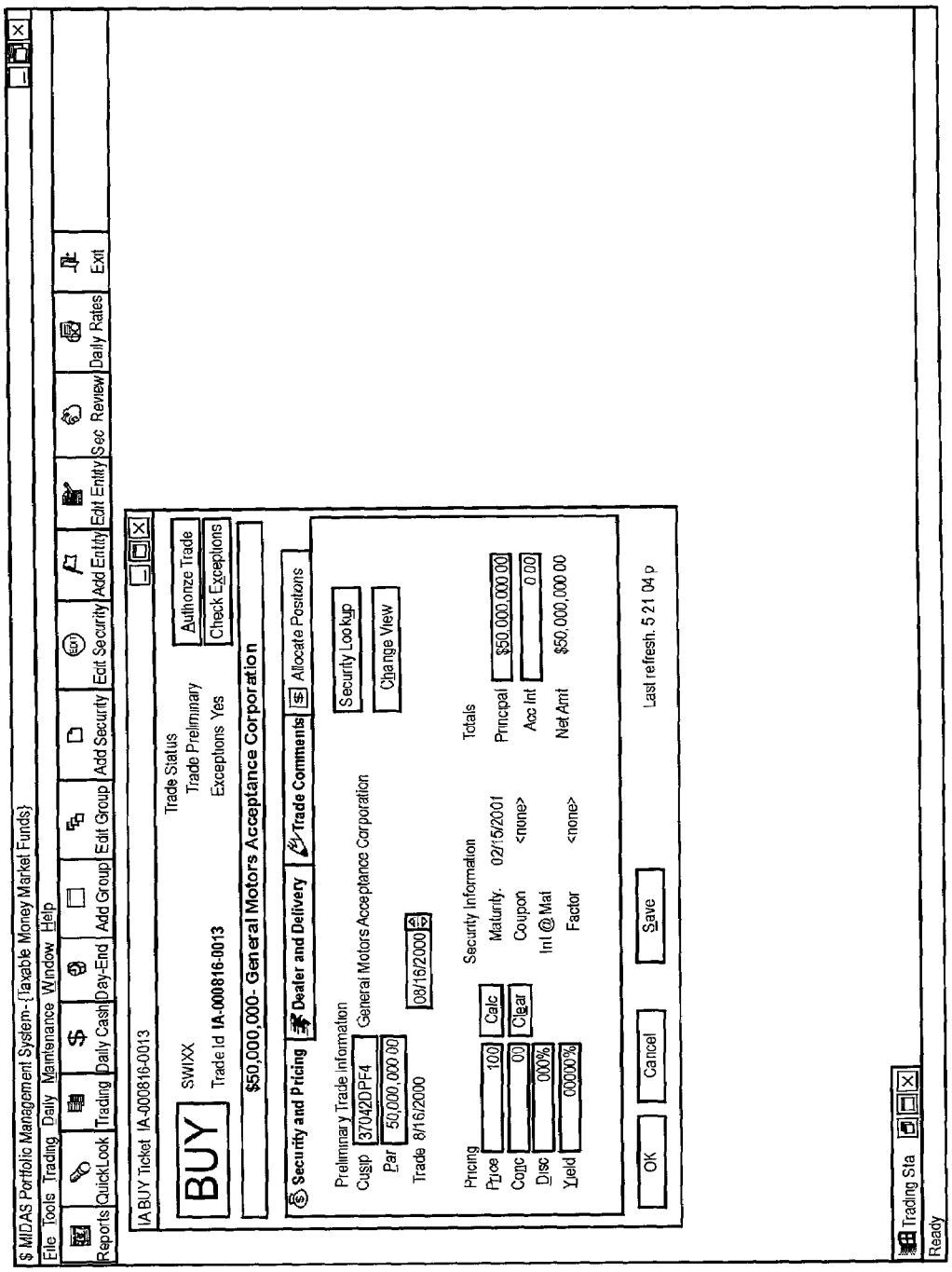
FIG. 15 is a printscreen that shows the ticket after authorization.

FIG. 15 is a printscreen that shows the ticket after authorization. Note the status in the upper right hand corner.

Although the invention is described herein with reference to the preferred embodiment, one skilled in the art will readily appreciate that other applications may be substituted for those set forth herein without departing from the spirit and scope of the present invention. Accordingly, the invention should only be limited by the claims included below.

Additionally, changing the presentation layer of the application (i.e., whether it is used with the interface shown here or with a new interface, such as delivered by a web browser) does not change the invention here. That is, the invention works "behind the scenes" and delivers the information to the presentation layer, which may be web-based or of the more traditional format shown here.

The invention claimed is:

1. An apparatus for pre-trade compliance checking in a mutual funds portfolio management system, comprising:
   a compliance engine comprising stored procedures on a database server for recording interpretations and assumptions of each trade rule and limit, said compliance engine comprising:
      a module for determination of entity exposure for each security traded;
      said module for determination of entity exposure comprising:
         a role an entity seeking compliance plays in context of a particular security; and
         an amount of exposure, wherein entity exposure is determined by analyzing a security involved in a trade to determine entity, type, and amount of exposure for each trade; wherein any changes to a characteristic of a security automatically cause a recalculation of exposure and an update to system accumulators;
      a module for determination of limits for each security traded,
         wherein each security traded in said portfolio management system is a money market fund; and
      a module for trading compliance checks, wherein a user presses a button to check compliance at any time; wherein, at authorization time, compliance checks are always run; and
   a display wherein, when there is an exception to a rule, a window is displayed and, for each compliance check, values are shown for an amount of room available both before and after execution of a trade being considered.

2. The apparatus of claim 1, wherein said compliance engine further comprises:
   a data portion for maintaining information from session to session;
   database tables for storing values that are needed for calculations; and
   stored procedures for performing data manipulation and computation.

3. The apparatus of claim 2, wherein said compliance engine further comprises:
   a business layer for storing and executing business logic.

4. The apparatus of claim 3, wherein said compliance engine further comprises:
   a visual layer for said user to enter requests and inspect results.

5. The apparatus of claim 1, wherein said compliance engine further comprises:
   a module for determining when a trade triggers an exception for each applicable compliance rule for any security group in a group of funds in which a trader is interested.

6. The apparatus of claim 1, wherein said compliance engine further comprises:
   at least one accumulator for storing entity exposure values as trades are entered.

7. The apparatus of claim 6, further comprising:
   at least two sets of accumulators for preliminary and authorized sets of exposure calculations.

8. The apparatus of claim 6, further comprising:
   a plurality of different accumulator tables for tracking different exposure calculations.

9. A method for pre-trade compliance checking in a portfolio management system, comprising the steps of:
   recording, by a server, interpretations and assumptions of each trade rule and limit with a compliance engine performing the steps of:
   determining, by the server, entity exposure for each security traded; said
   determining step comprising the steps of:
      determining, by the server, a role an entity seeking compliance plays in context of a particular security;
      determining, by the server, an amount of exposure, wherein an amount of exposure is determined by analyzing a security involved in a trade o determine entity, type, and amount of exposure for each trade; wherein any changes to a characteristic of a security automatically cause a recalculation of exposure and an update to system accumulators; and
      determining, by the server, limits for each security traded, wherein each security traded in said portfolio management system is a money market fund;
   performing, by the server, trading compliance checks, wherein a user may press a button to check compliance at any time; wherein, at authorization time, compliance checks are always run; and
   displaying, by the server, a window when there is an exception to a rule and, for each compliance check, values are shown for an amount of room available both before and after execution of a trade being considered.

10. The method of claim 9, wherein said compliance engine further performs the steps of:
    maintaining information from session to session;
    storing values that are needed for calculations; and
    performing data manipulation and computation.

11. The method of claim 10, wherein said compliance engine further performs the step ok
    storing and executing business logic.

12. The method of claim 11, wherein said compliance engine further performs the step of:
   providing a visual layer for said user to enter requests and inspect results.

13. The method of claim 9, wherein said compliance engine further performs the step of:
   determining when a trade triggers an exception for each applicable compliance rule for any security group in a group of funds in which a trader is interested.

14. The method of claim 9, wherein said compliance engine further performs the step of:
   providing at least one accumulator for storing entity exposure values as trades are entered.

15. The method of claim 14, further comprising the step of:
   providing at least two sets of accumulators for preliminary and authorized sets of exposure calculations.

16. The method of claim 14, further comprising the step of:
   providing a plurality of different accumulator tables for tracking different exposure calculations.

17. A method for pre-trade compliance checking in a portfolio management system, comprising the steps of:
   determining, by a server, entity exposure for each security traded, wherein determining entity exposure for each security traded comprises determining, by the server, a role an entity seeking compliance plays in context of a particular security, and determining, by the server, an amount of exposure, wherein determining an amount of exposure comprises first determining if the particular security is to be treated as a government security, and if the particular security is treated as a government security, then characterizing the particular security as exempt, and if the particular security is not treated as a government security, then continuing to determine the amount of exposure, wherein entity exposure is determined by analyzing a security involved in a trade to determine entity, type, and amount of exposure for each trade, wherein any changes to a characteristic of a security automatically cause a recalculation of exposure and an update to system accumulators;
   determining, by the server, limits for each security traded; and
   displaying, by the server, the limit, in a display, for each security traded.

18. The method of claim 17 wherein determining limits comprises performing a guarantor diversification test.

19. The method of claim 18 wherein determining limits comprises performing an issuer diversification test.

20. An apparatus for pre-trade compliance checking in a mutual funds portfolio management system, comprising:
   a compliance engine comprising stored procedures on a database server for recording interpretations and assumptions of each trade rule and limit, said compliance engine comprising:
   a module for determination of entity exposure for each security traded;
      said module for determination of entity exposure comprising:
         a role an entity seeking compliance plays in context of a particular security; and
            an amount of exposure, wherein entity exposure is determined by analyzing a security involved in a trade to determine entity, type, and amount of exposure for each trade; wherein any changes to a characteristic of a security automatically cause a recalculation of exposure and an update to system accumulators;
   a module for determination of limits for each security traded,
      wherein each security traded in said portfolio management system is a money market fund; and
   a module for trading compliance checks,
      wherein a user may press a button to check compliance at any time and at authorization time, compliance checks are always run,
      wherein each rule has a start and end date indicating the period of time each rule is effective,
   a display wherein when there is an exception to a rule, a window is displayed and, for each compliance check, values are shown for an amount of room available both before and after execution of a trade being considered.

21. The apparatus of claim 20 wherein the amount of exposure includes the exposure to an industry sector.

22. The apparatus of claim 20 wherein the amount of exposure includes the exposure to a super sector, wherein a super sector is a grouping of sectors.

* * * * *